(12) United States Patent
Amano

(10) Patent No.: US 8,152,313 B2
(45) Date of Patent: Apr. 10, 2012

(54) PROJECTION DISPLAY DEVICE THAT DISPLACES AN OPTICAL POSITION OF AN IMAGER IN CONJUNCTION WITH A FOCUS ADJUSTMENT

(75) Inventor: Ryuhei Amano, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 386 days.

(21) Appl. No.: 12/426,725

(22) Filed: Apr. 20, 2009

(65) Prior Publication Data
US 2009/0279055 A1 Nov. 12, 2009

(30) Foreign Application Priority Data
May 9, 2008 (JP) ................................ 2008-123922

(51) Int. Cl.
*G03B 21/14* (2006.01)
*H04N 3/22* (2006.01)

(52) U.S. Cl. ........................................ 353/101; 348/745

(58) Field of Classification Search .................... 353/69, 353/70, 74, 101, 119; 348/745
See application file for complete search history.

(56) References Cited

U.S. PATENT DOCUMENTS

| | | | |
|---|---|---|---|
| 5,741,057 A * | 4/1998 | Goldberg et al. | 353/74 |
| 5,798,864 A * | 8/1998 | Sekiguchi | 359/559 |
| 2005/0099609 A1* | 5/2005 | Masuzawa et al. | 353/101 |

FOREIGN PATENT DOCUMENTS

| | | |
|---|---|---|
| JP | 05-100312 A | 4/1993 |
| JP | 2006-235516 A | 9/2006 |

* cited by examiner

*Primary Examiner* — Thanh X Luu
*Assistant Examiner* — Danell L Owens
(74) *Attorney, Agent, or Firm* — Marvin A. Motsenbocker; Mots Law, PLLC

(57) ABSTRACT

A projection display device has an imager that modulates light from a light source in accordance with an image signal, a projection optical system that enlarges and projects the light modulated by the imager onto a projection plane, a focus adjustment part disposed in the projection optical system, and a displacement part that displaces the imager in a direction vertical to a light axis of the projection optical system, in conjunction with the focus adjustment part.

5 Claims, 16 Drawing Sheets

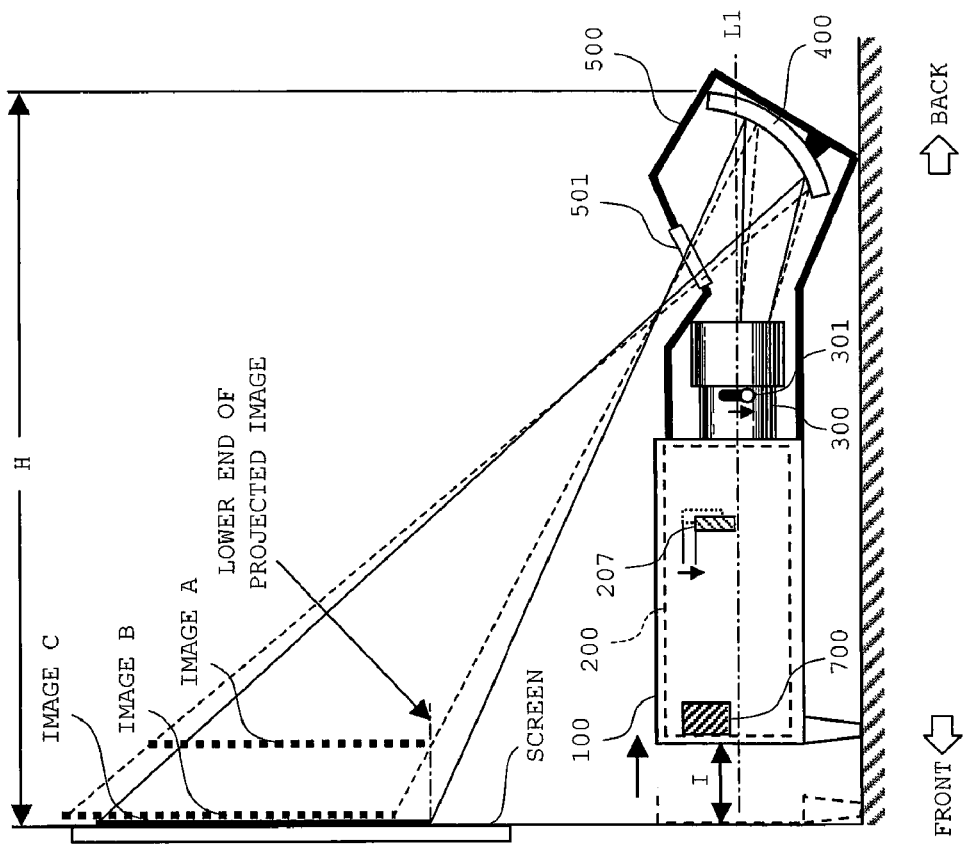
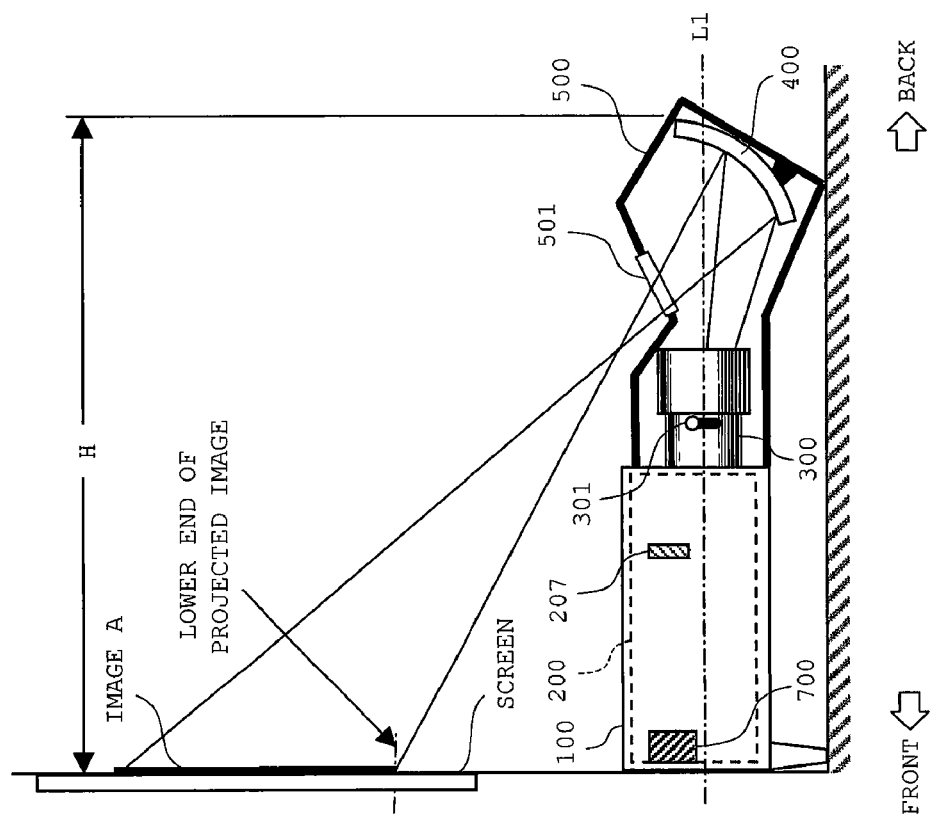

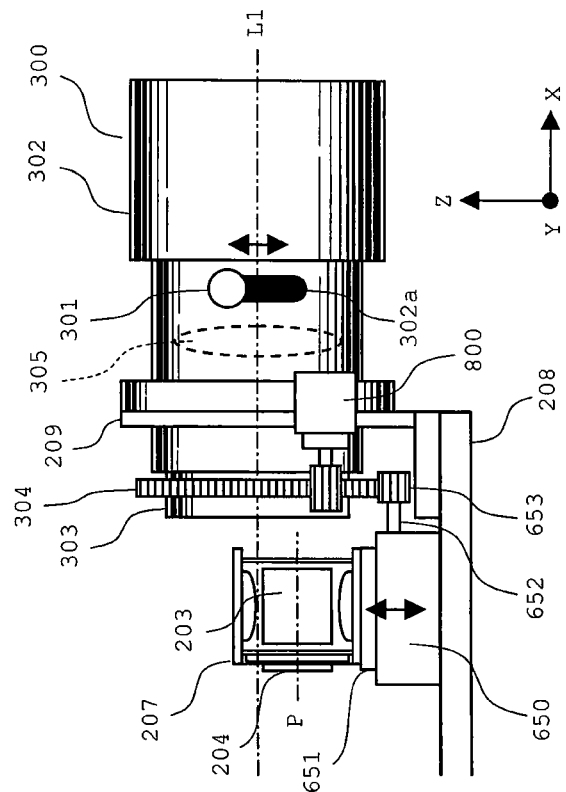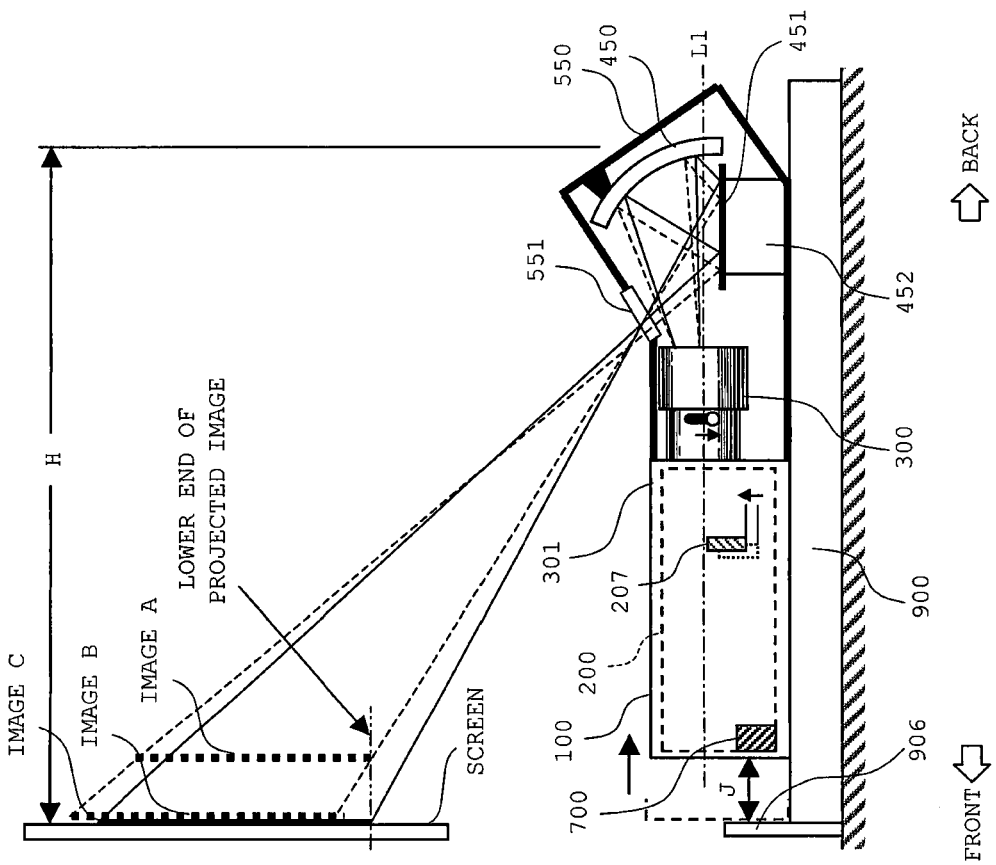

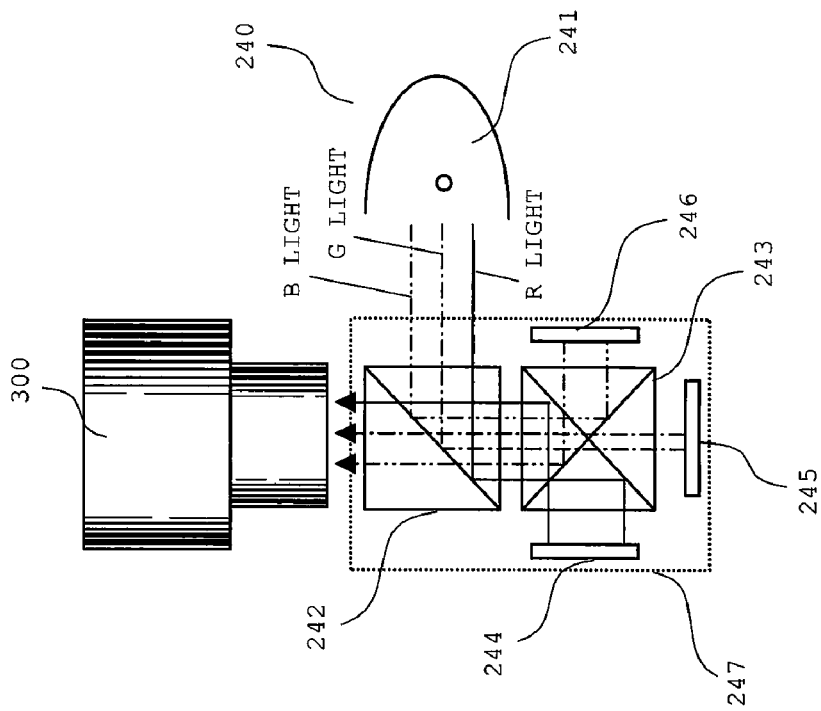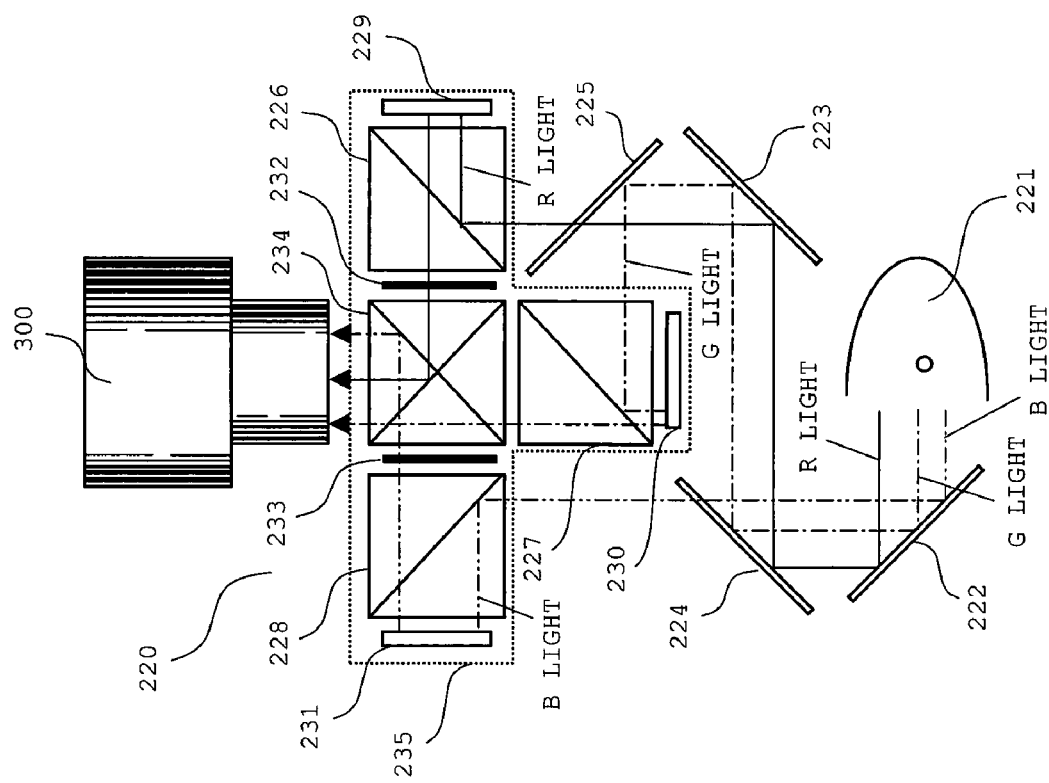

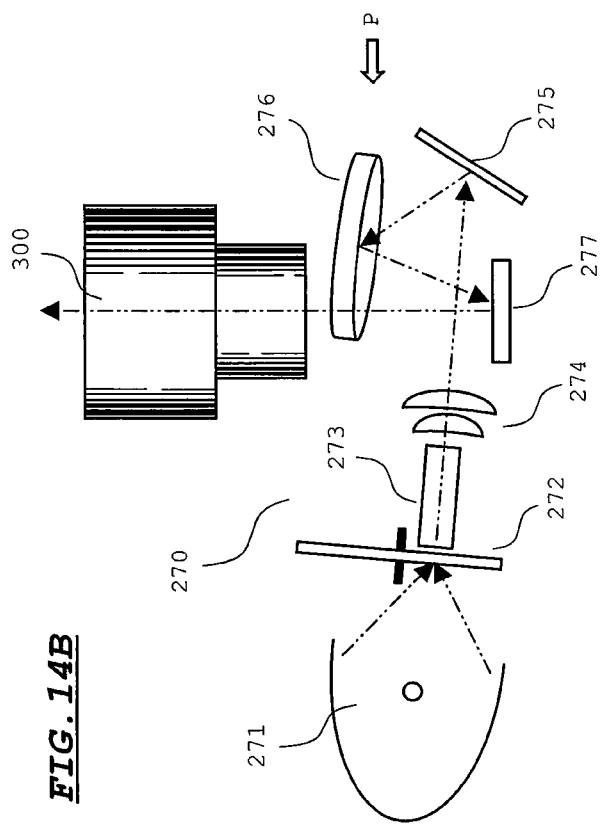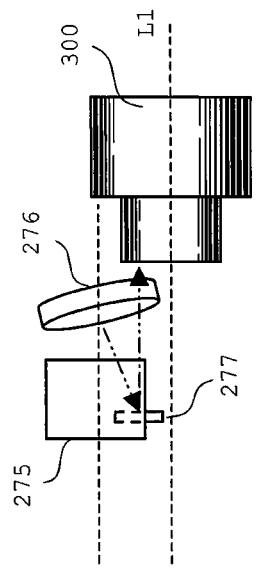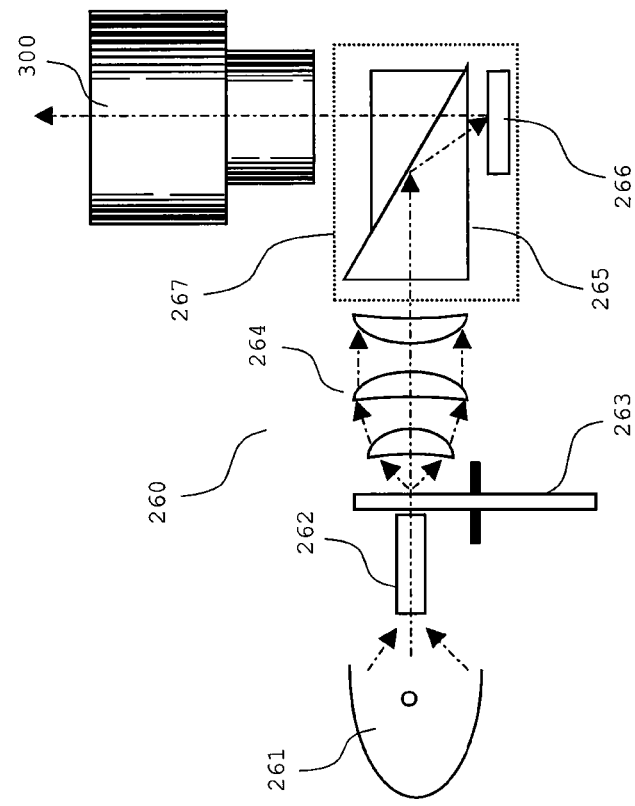
FIG. 14A
FIG. 14B
FIG. 14C

PROJECTION DISPLAY DEVICE THAT DISPLACES AN OPTICAL POSITION OF AN IMAGER IN CONJUNCTION WITH A FOCUS ADJUSTMENT

This application claims priority under 35 U.S.C. Section 119 of Japanese Patent Application No. 2008-123922 filed May 9, 2008, entitled "PROJECTION DISPLAY DEVICE".

BACKGROUND OF THE INVENTION

1. Field of the Invention

The present invention relates to a projection display device that enlarges and projects an image on an imager onto a projection plane, and more specifically is suitably used for a projection display device that projects light onto a projection plane in an oblique direction.

2. Description of the Related Art

At present, there are commercialized and widely spread projection display devices (hereinafter, referred to as "projectors") that enlarge and project an image on an imager (such as a liquid crystal panel) onto a projection plane (such as a screen). For this kind of projectors, various techniques for shortening a throw distance have been proposed. The term "throw distance" herein refers to a distance from a projection aperture in a projector or a terminal optical component in a projection optical system to a plane including a projection plane. If the throw distance is short, projected light is less prone to be cut off by some obstacle, thereby increasing usability of the projector and convenience of a user.

As a technique for shortening a throw distance, there is a possible configuration of a projector in which an optical system is made wide-angle and a travel direction of projected light is inclined with respect to a light axis of the projection optical system. In this arrangement, for example, a wide-angle lens with a large angle of view is used as a projection optical system, and an imager and a screen are shifted so as to be mutually opposed with respect to the light axis of the projection optical system. This accomplishes shortening of the throw distance.

Another arrangement uses a refracting optical system and a reflecting optical system as a projection optical system. In this arrangement, an image on an imager is formed as an intermediate image between the refracting optical system and the reflecting optical system. The intermediate image is enlarged and projected onto the screen in an oblique direction by the reflecting optical system (curved mirror). This accomplishes shortening of the throw distance.

On a projector with such an oblique-projection arrangement, a size of a projected image (hereinafter, referred to as "projection size") can be adjusted by changing the throw distance as appropriate. For example, the projection size can be decreased by making the projector closer to the screen to shorten the throw distance. In addition, the projection size can be increased by making the projector away from the screen to lengthen the throw distance.

When the throw distance is changed in such a manner as stated above, the projected image is brought into an off-focus state, and it is thus necessary to make a focus adjustment as needed. Such a focus adjustment can be made with relatively simple operations of a focus adjustment mechanism provided in the projection optical system. However, in such an arrangement in which projected light is obliquely projected onto the screen at a wide angle as described above, the position of the projected image on the projection plane shifts significantly upward or downward with a change in throw distance. Accordingly, in changing the projection size during usage of the projector, it is necessary to make a focus adjustment and a position correction in a rapid manner to the projected image while making a change to the throw distance.

For general use, when installing a projector that projects obliquely an image onto a screen (projection plane) at a wide angle, height of the screen is adjusted or height of the projector is adjusted using a stand or the like as appropriate, so as to project the projected image onto the screen in a desired position (e.g. the center). Accordingly, when making a position adjustment to the projected image with a change in projection size as stated above, it is necessary to adjust screen height or projector height, and such adjustments involve significantly complicated tasks.

Further, in a projector with a refracting optical system and a reflecting optical system as a projection optical system, the projection optical system becomes large in size and weight due to the additional reflecting optical system. Additionally, in this arrangement, since the reflecting optical system (curved mirror) forms a wide-angle structure, the position of a projected image varies greatly even with a slight change in inclination of the projector main body. Therefore, significantly delicate tasks are needed for making a position adjustment to a projected image. From such factors as stated above, it is understood that a projector with a reflecting optical system requires considerable efforts and complicated tasks in making a position adjustment to a projected image. To simplify such adjustment tasks, a separate mechanism may be added to make a height adjustment to the projection optical system. However, since the projection optical system is large-sized and high-weight as stated above, a significantly large-scale mechanism is required to displace the overall projection optical system including the refracting optical system and the reflecting optical system.

SUMMARY OF THE INVENTION

An object of the present invention is to provide a projection display device that allows a focus adjustment and a position adjustment to a projected image in an easy manner, even if a throw distance is changed at the time of adjustment of a projection size.

A projection display device in a main aspect of the present invention includes an imager that modulates light from a light source in accordance with an image signal, a projection optical system that enlarges and projects the light modulated by the imager onto a projection plane, a focus adjustment part provided in the projection optical system, a displacement part that displaces the imager in a direction vertical to a light axis of the projection optical system in conjunction with operation of the focus adjustment means.

According to the projection display device in the main aspect of the present invention, when a projection size is changed and a focus adjustment is made to a projected image, the position of the imager is displaced in conjunction with the adjustment. This displaces an incident position of light from the imager with respect to the projection optical system. As a result, the position of the projected image on the projection plane is made closer to the position before the change of the projection size.

BRIEF DESCRIPTION OF THE DRAWINGS

The foregoing and other objects and novel features of the present invention will be more fully understood from the following description of the preferred embodiments when reference is made to the accompanying drawings.

FIGS. 4A and 4B are diagrams showing a configuration of a projector in a modification example 1;

FIGS. 8A and 8B are diagrams showing a configuration of a projector in a modification example 2;

FIGS. 13A and 13B are diagrams for describing modification examples of the optical engine (arrangement example 1 and arrangement example 2);

FIGS. 14A, 14B, and 14C are diagrams for describing modification examples of the optical engine (arrangement example 3 and arrangement example 4);

However, the drawings are only for purpose of description, and do not limit the scope of the present invention.

DESCRIPTION OF THE PREFERRED EMBODIMENTS

Figure 1:
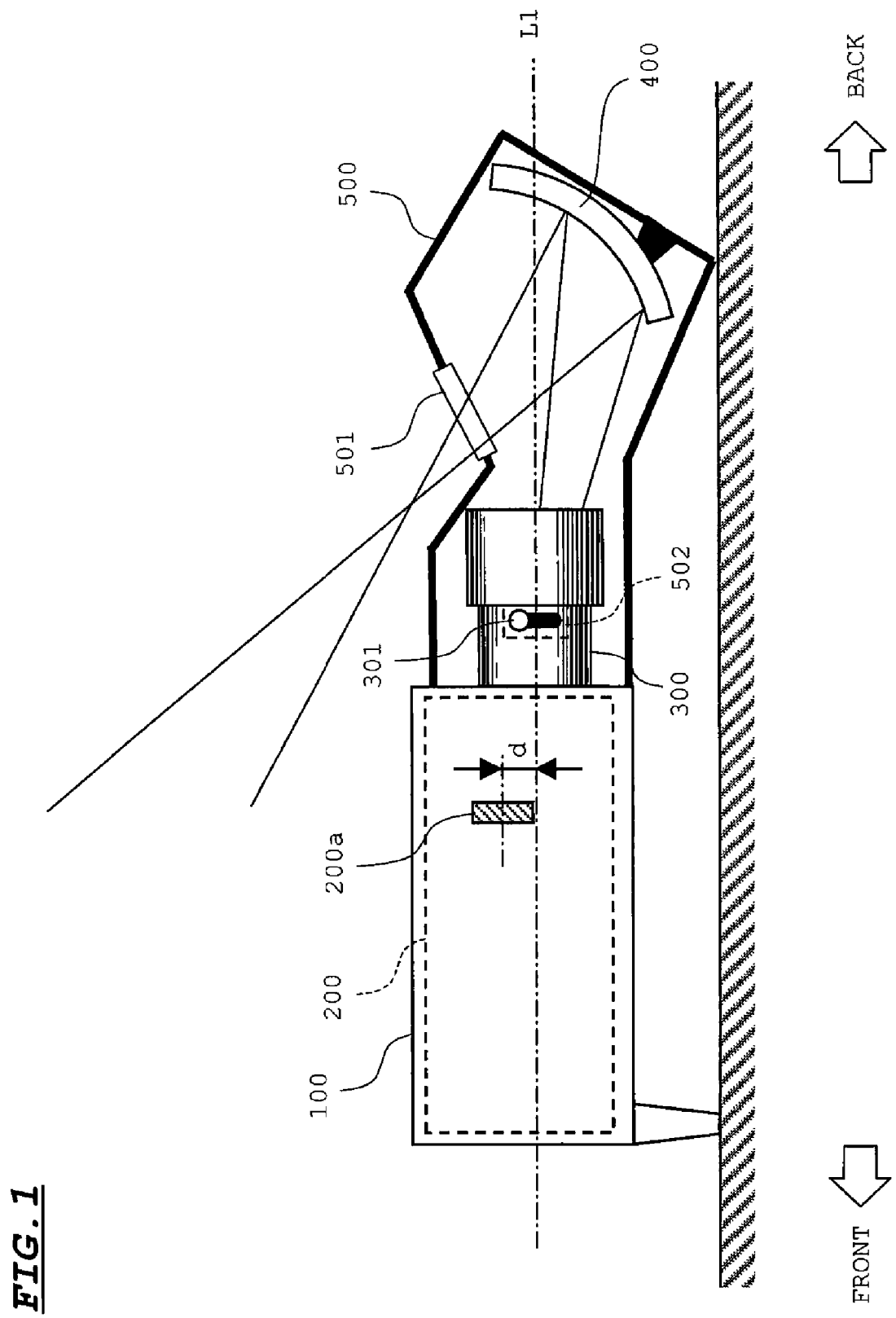
FIG. 1 is a diagram showing a configuration of a projector in an embodiment of the present invention.

Preferred embodiments of the present invention will be described below with reference to the drawings. FIG. 1 shows a configuration of a projector in an embodiment.

As shown in the diagram, the projector includes a housing 100, an optical engine 200, a lens unit 300, a reflective mirror 400, and a cover 500.

The housing 100 stores the optical engine 200, and the optical engine 200 generates light modulated in accordance with an image signal (hereinafter, referred to as "image light"). The lens unit 300 is attached to the optical engine 200, and the image light emitted from the optical engine 200 is entered into the lens unit 300. In the optical engine 200, an imager 200a generating the image light is disposed in such a manner that a center of an effective display area thereof is shifted by a predetermined distance d from a light axis L1 of the lens unit 300.

The lens unit 300 has a focus adjustment lever 301 (hereinafter, referred to as "focus lever"). As described later, a user can operate the focus lever 301 to make a focus adjustment and a position adjustment to an image projected onto a screen.

The reflective mirror 400 is disposed behind the lens unit 300. The reflective mirror 400 has an aspheric or freely curved concave reflective surface and has an effective reflection area at a lower side (opposite to a projection aperture 501) with respect to the light axis L1 of the lens unit 300. The reflective mirror 400 reflects the image light emitted from the lens unit 300.

The cover 500 envelops the lens unit 300 and the reflective mirror 400. The cover 500 has a projection aperture 501 through which the image light reflected by the reflective mirror 400 passes, and an opening 502 for exposing the focus lever 301 to the outside.

The image light reflected by the reflective mirror 400 is most converged in the vicinity of the projection aperture 501, and then enlarged and projected onto a screen disposed at an upper and forward side of the projector.

In the projector, when a distance between the screen and the projector main body is changed, a throw distance H of image light (refer to FIG. 3) from the projector to the screen is changed accordingly, whereby a projection size is enlarged or contracted. Accordingly, the projection size can be decreased by making the projector main body closer to the screen, and the projection size can be increased by making the projector main body away from the screen. In this embodiment, a distance from the terminal optical component (the reflective mirror 400) in the projection optical system to the projection plane is designated as "throw distance".

Figure 2A:
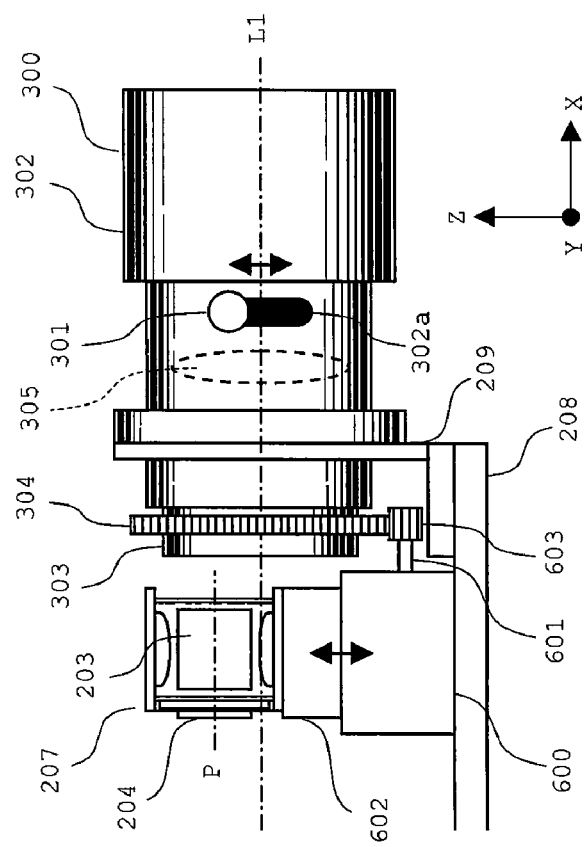
FIGS. 2A and 2B are diagrams showing configurations of an optical engine and a lens unit in the embodiment.
Figure 2B:
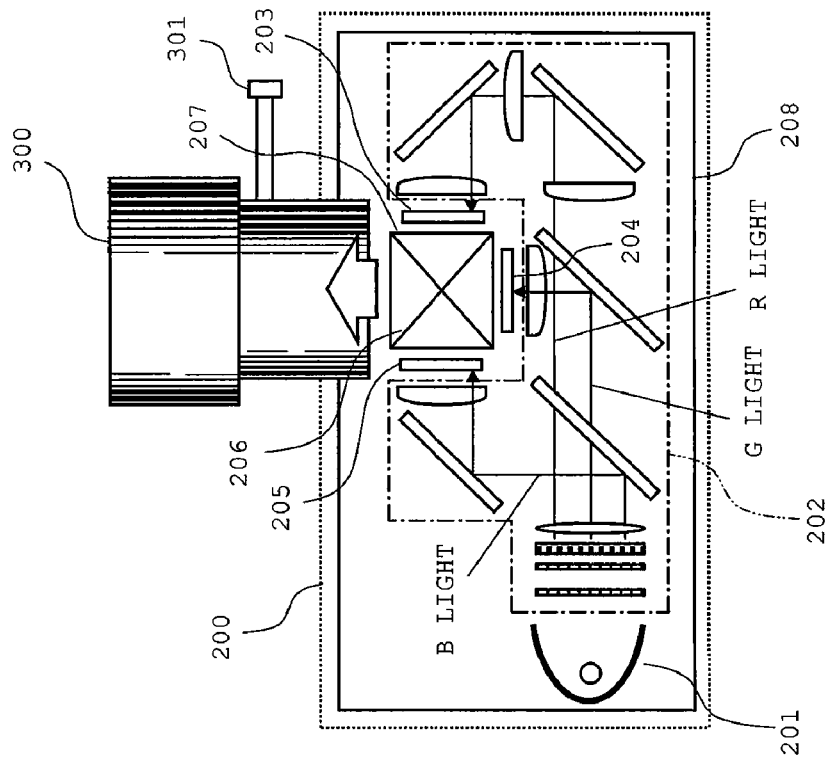

FIGS. 2A and 2B shows configurations of the optical engine 200 and the lens unit 300.

FIG. 2A is a top perspective view of an internal structure of the optical engine 200. As shown in FIG. 2A, the optical engine 200 includes a light source 201, a light-guiding optical system 202, three transmissive liquid crystal panels 203, 204, and 205 as an imager 200a, and a dichroic prism 206. The liquid crystal panels 203, 204, and 205 each have polarizers (not shown) on an incident side and an output side. The liquid crystal panels 203, 204, and 205 and the dichroic prism 206 are formed as an imager module 207. These optical components are disposed on an installation plate 208.

A white light emitted from the light source 201 is separated by the light-guiding optical system 202 into a red-waveband light (hereinafter, referred to as "R light"), a green-waveband light (hereinafter, referred to as "G light"), and a blue-waveband light (hereinafter, referred to as "B light"), and then applied to the liquid crystal panels 203, 204, and 205. The R, G, and B lights modulated by the liquid crystal panels 203, 204, and 205 are combined and emitted as image light by the dichroic prism 206.

The imager disposed in the optical engine 200 may be the transmissive liquid crystal panels 203, 204, and 205, reflective liquid crystal panels, or MEMS devices. When using liquid crystal panels, the optical system may be of a single-plate type using a color wheel, instead of a three-plate type.

FIG. 2B is a diagram showing an adjustment structure in which the focus lever 301 concurrently makes a focus adjustment and a position adjustment to a projected image.

An attachment plate 209 is fixed to the installation plate 208 of the optical engine 200. The lens unit 300 is attached at an incident aperture to the attachment plate 209.

An inner cylinder 303 is disposed in an outer cylinder 302 of the lens unit 300. A base end of the focus lever 301 is fixed to the inner cylinder 303. The focus lever 301 is rotatable by a predetermined range in an in-plane direction of a Y-Z plane in the diagram. The outer cylinder 302 has a slit 302a spanning the rotatable range of the focus lever 301. The focus lever 301 is exposed through the slit 302a to outside the outer cylinder 302.

When the focus lever 301 turns, the inner cylinder 303 turns accordingly. When the inner cylinder 303 turns, the position of a moving lens group 305 in the lens unit 300 is displaced in a direction of the light axis L1 by an interlocking mechanism such as a cam mechanism. This makes a focus adjustment to a projected image.

For example, if the projector is located at the shortest throw distance H with which the projection size becomes minimum, the focus lever 301 is set to an upper-end position (an upper-limit position where the focus lever 301 cannot turn upward any more) of the slit 302a to displace the moving lens group 305 to an on-focus position, thereby bringing a projected image into proper focus. In addition, if the projector is located at the longest throw distance H with which the projection size becomes maximum, the focus lever 301 is set to a lower-end position (a lower-limit position where the focus lever 301 cannot turn downward any more) of the slit 302a to displace the moving lens group 305 to the on-focus position, thereby bringing a projected image into proper focus.

The inner cylinder 303 has a lens-side gear 304 at a leading end. When the inner cylinder 303 turns, the lens-size gear 304 turns accordingly.

The Z axis stage 600 is disposed on the installation plate 208. The Z axis stage 600 has a rotation axis 601. When the rotation axis 601 rotates, the stage 602 moves in an up-down direction (a direction of a Z axis). An imager-side gear 603 is attached to a leading end of the rotation axis 601. The imager-side gear 603 engages with the lens-side gear 304. When the lens-side gear 304 turns, the imager-side gear 603 turns accordingly.

The imager module 207 is placed on the stage 602 of the Z axis stage 600. In this placement state, a center P in the effective display areas of the liquid crystal panels 203, 204, and 205 is shifted upward (a direction opposite to the installation plate 208) with respect to the light axis L1 of the lens unit 300.

When the focus lever 301 is in the upper-limit position, the imager module 207 is set by the Z axis stage 600 in a highest position, that is, the position where the center P is in farthest from the light axis L1. In this state, when the focus lever 301 turns downward, the stage 602 moves downward accordingly, thereby to move the imager module 207 downward. Then, when the focus lever 301 reaches the lower-limit position, the imager module 207 is brought into a lowest position, that is, the position where the center P is closest to the light axis L1. In addition, when the focus lever 301 turns upward, the imager module 207 moves upward accordingly.

When the imager module 207 (the liquid crystal panels 203, 204, and 205) moves in the up-down direction, the incident position of image light on the lens unit 300 moves in the up-down direction, whereby the position of a projected image is displaced in an up-down direction.

As described later, a gear ratio between the lens-side gear 304 and the imager-side gear 603 is set such that, when the focus lever 301 is turned to a position of proper focus with a change in the throw distance H, the imager module 207 is displaced in the direction of the Z axis, whereby the lower end of the projected image can be held in approximately the same position without upward or downward shift.

Spot sizes of the R, G, and B lights applied to the liquid crystal panels 203, 204, and 205 are made larger than the effective display areas of the liquid crystal panels, so that, even if the imager module 207 moves upward or downward, the lights are applied to the overall panels.

Figure 3A:
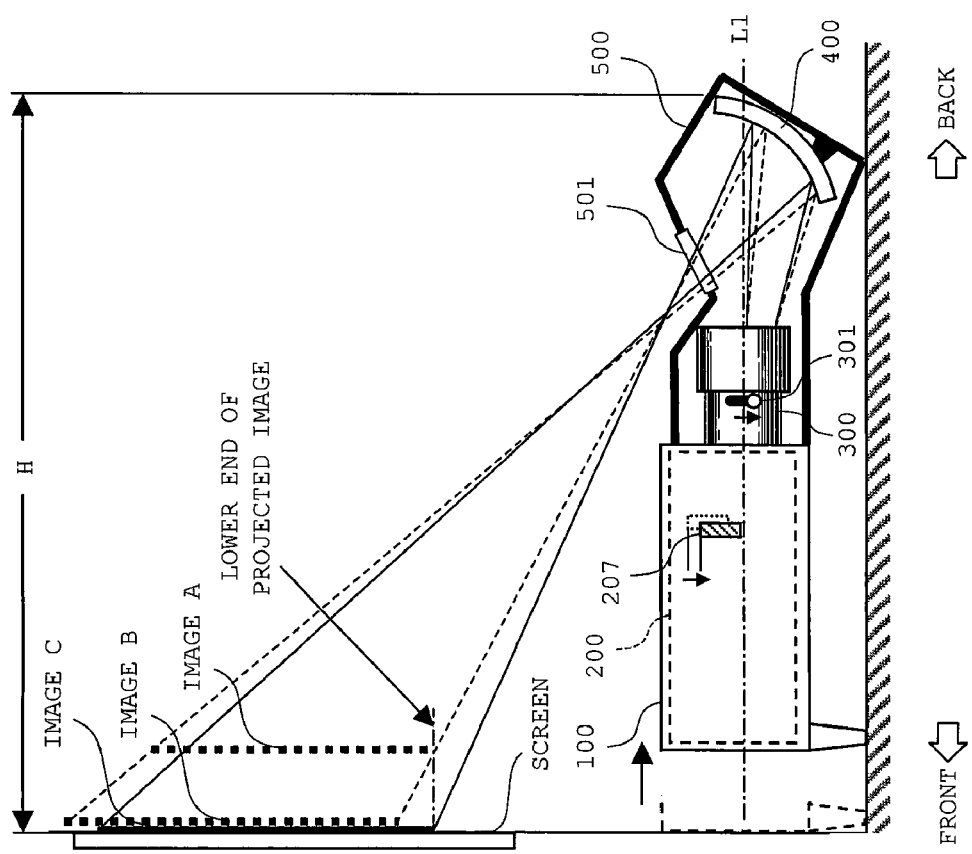
FIGS. 3A and 3B are diagrams for describing operations of a focus adjustment and a position adjustment in the embodiment.
Figure 3B:
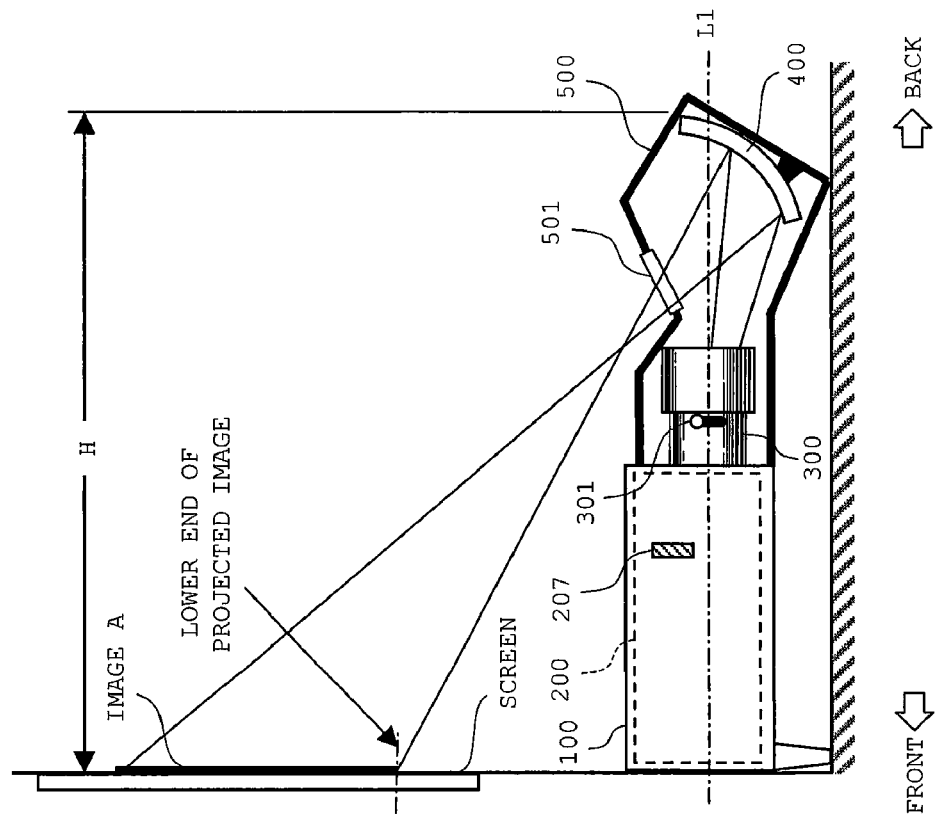

FIGS. 3A and 3B are diagrams for describing operations of a focus adjustment and a position adjustment to a projected image. FIG. 3A illustrates the projector that is installed such that the projection size is minimum, and FIG. 3B illustrates the projector that is made away from the screen to increase the projection size.

In this arrangement, the screen is disposed on a wall in a room, for example. When projecting an image onto the screen, a user installs the projector with adjustment of the throw distance H between the screen plane and the projector for a desired projection size, as shown in FIG. 3A. At that time, the user adjusts height of the screen or height of the projector by using a stand or the like as necessary, so that an image is projected onto the screen in a desired position (the center, for example). In addition, the user operates the focus lever 301 to make a focus adjustment to the projected image. Accordingly, the image is projected onto the screen in a state of Image A in the diagram.

In this embodiment, for example, the projector is configured in such a manner that a front side of the projector becomes tightly close to the wall surface, that is, the throw distance H becomes minimum, as shown in FIG. 3A. Accordingly, when projecting an image in the minimum projection size, the projector is installed with the front side tightly close to the wall surface, that is, at minimum throw distance H. At that time, the focus lever 301 is in the upper-limit position, and the imager module 207 is farthest from the light axis L1.

If there arises a need for increasing the projection size during image projection, the user can move the projector away from the screen as shown in FIG. 3B. This lengthens the throw distance H, and therefore the projection size is enlarged from the size of Image A to the size of Image B. Concurrently, the projected image goes out of focus, and the position of the projected image is shifted upward.

Then, the user makes another focus adjustment. More specifically, the user turns the focus lever 301 downward until the projected image comes into proper focus.

As stated above, when the focus lever 301 turns downward, the imager module 207 moves downward and comes closer to the light axis L1 accordingly. As a result, chief ray positions of the image light at the upper and down ends emitted from the lens unit 300 (hereinafter, "chief ray positions at the upper and lower ends" abbreviated as "light positions") are changed from ray positions shown by dotted lines in FIG. 3B to ray positions shown by solid lines in FIG. 3B. More specifically, the ray positions of the image light from the lens unit 300 become closer to the light axis L1, and the incident position of the image light on the reflective mirror 400 is shifted upward accordingly. This lowers the ray positions of the image light reflected by the reflective mirror 400 and headed toward the screen. Accordingly, the position of the image projected onto the screen comes down.

Thus, when the focus lever 301 is turned to the position of proper focus, the position of the imager module 207 is lowered in accordance with the gear ratio between the lens-side gear 304 and the imager-side gear 603 as described above. This changes the position of the projected image from the position of Image B to the position of Image C, and the lower end of Image C is set in the same position as the lower end of Image A before the movement of the projector. That is, the position of the lower end of the projected image can be held in the same position even with a change in the throw distance H.

In addition, the projector may be configured in such a manner that the position of an upper end of the projected image, or the position of a center of the projected image, is held in the same position, not that the position of the lower end of the projected image is held in the same position as stated above. In this arrangement, an amount of movement of the projected image depends on in what portion the projected image is to be held, and therefore an amount of movement of the imager module 207 varies accordingly. Therefore, the gear ratio between the lens-side gear 304 and the imager-side gear 603 is adjusted in accordance with the intended arrangement.

In addition, the projector may be configured in such a manner that a focus adjustment and a position adjustment are made to a projected image by rotating the lens-side gear 304 with a drive motor. In this arrangement, an operating button (not shown) may be disposed on the projector to actuate the drive motor, or a dedicated remote control (not shown) may be provided to actuate the drive motor.

As described above, this embodiment makes it possible to make a focus adjustment in accordance with a change in projection size and correct a positional shift of a projected image at the same time. Therefore, a user does not need to make complicated adjustments such as a screen height adjustment with each change in projection size. This enables the user to make a focus adjustment and a position adjustment to a projected image through a simple operation with a change in projection size (change in throw distance), thereby enhancing the convenience of the user.

Although an embodiment of the present invention is described as above, the embodiment of the present invention can be modified as below.

Modification Example 1

FIGS. 4A and 4B show configurations of a projector in the modification example 1. FIG. 4A illustrates the projector which is installed such that the projection size becomes minimum, and FIG. 4B illustrates the projector which is made away from the screen to increase the projection size.

In the configuration of the modification example 1, a focus adjustment and a position adjustment are automatically made to a projected image in accordance with the throw distance H.

More specifically, a distance sensor 700 is disposed at a front end of the housing 100 to detect a distance between the screen and the front end of the housing 100, that is, a distance between the screen and the projector main body (hereinafter, referred to as "main body distance I"). Since the main body distance I varies with a change in the throw distance H, it is possible to make a focus adjustment and a position adjustment to a projected image in accordance with the throw distance H by making a focus adjustment and a position adjustment to a projected image in accordance with the main body distance I.

As stated above, the projection distance H is not directly detected in the modification example 1, and thus the distance sensor 700 may be disposed in the same position as the reflective mirror 400, thereby to directly detect the throw distance H. Alternatively, the distance sensor 700 may be arbitrarily disposed in the projector. This is because, when the throw distance H changes, a distance between the screen and the arbitrary position of the projector also changes accordingly.

Further, in the configuration of the modification example 1, the optical engine 200 has a drive motor 800 (not shown in FIGS. 4A and 4B) for driving the inner cylinder 303 and the Z axis stage 600. In addition, the optical engine 200 has a control system to control the drive motor 800 in accordance with the main body distance I detected by the distance sensor 700. In other respects of the configuration, this example is the same as the foregoing embodiment.

Figure 5:
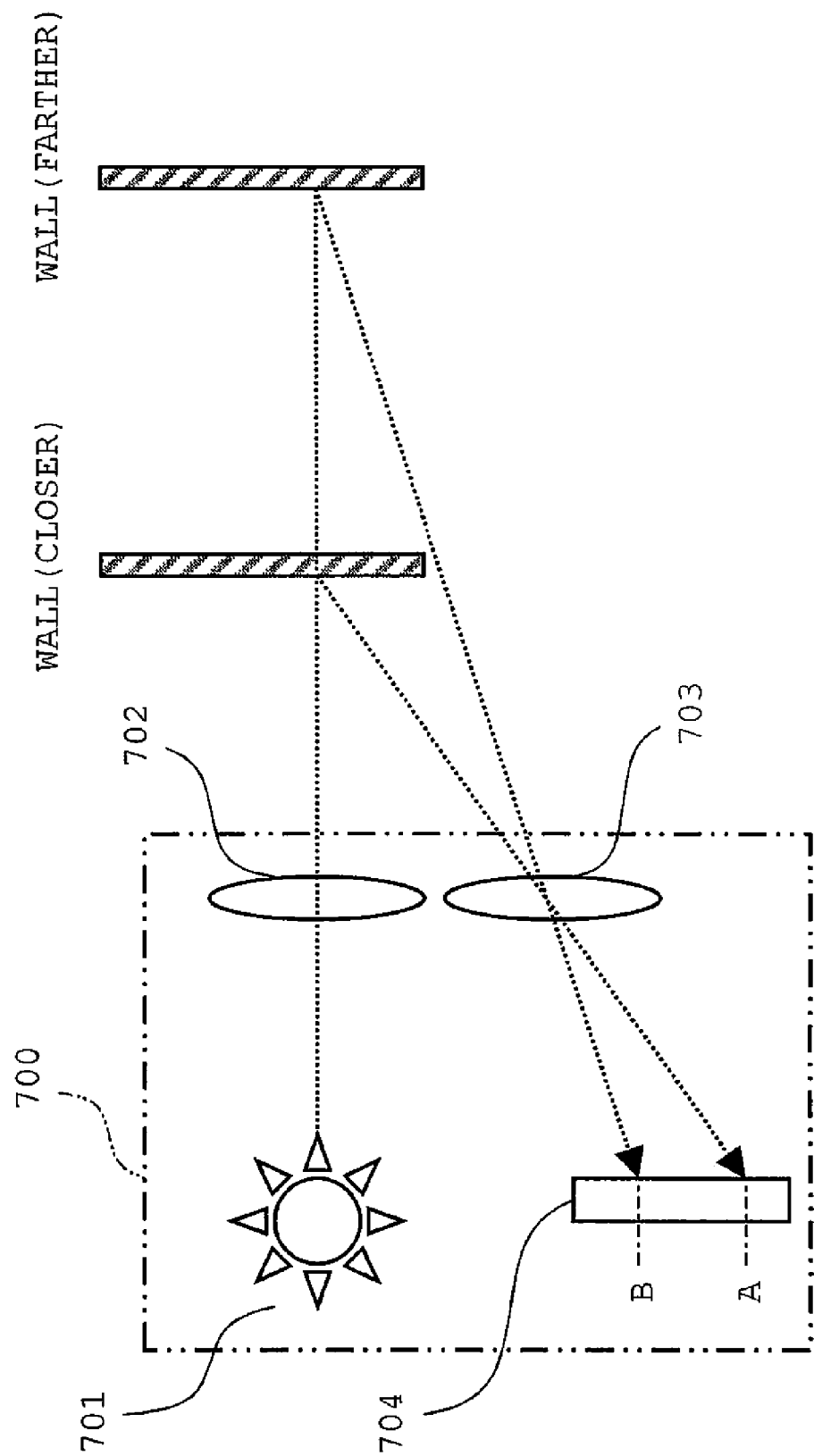
FIG. 5 is a diagram showing a configuration of a distance sensor in the modification example 1.

FIG. 5 shows a configuration of the distance sensor 700. The distance sensor 700 includes a light emitter 701, a light-emitting lens 702, a light-receiving lens 703, and a position detector 704. The light emitter 701 is formed of an infrared LED, for example. The position detector 704 is formed of a position sensitive detector (PSD), for example.

Light emitted from the light emitter 701 is collected by the light-emitting lens 702, impinges as approximately parallel light on a wall surface, and is diffusely reflected by the wall surface. The diffusely reflected light is collected by the light-receiving lens 703, and applied to a light-receiving surface of the position detector 704. In this arrangement, when a distance from the distance sensor 700 to the wall surface changes, an application position of the reflected light on the light-receiving surface of the position detector 704 changes accordingly. The position detector 704 outputs a position detection signal in accordance with the application position.

The light emitter 701 may be formed by a semiconductor laser. In this case, laser light emitted from the semiconductor laser is high in directivity, and therefore the light-emitting lens 702 may be omitted.

Figure 6:
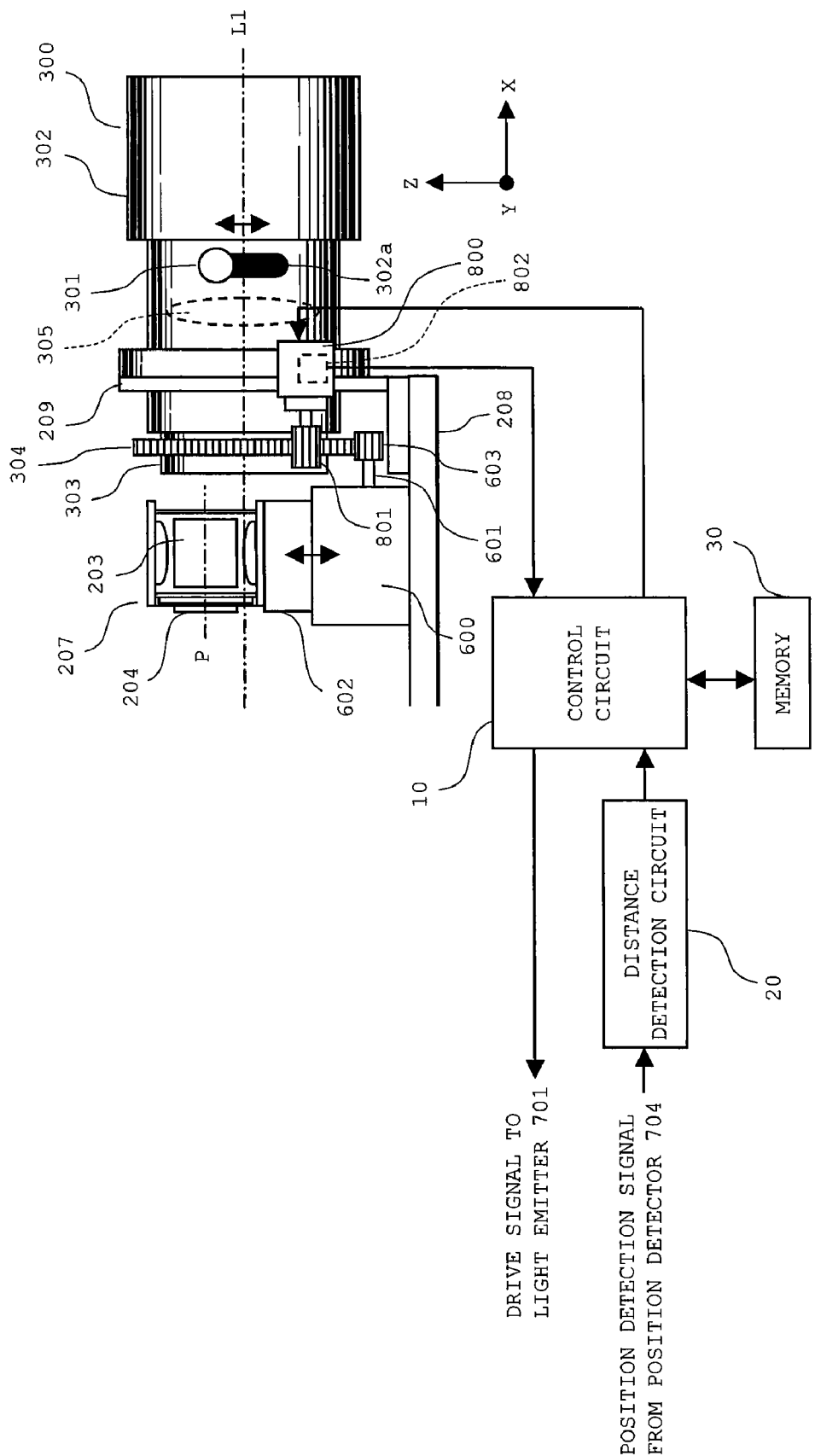
FIG. 6 is a diagram showing an adjustment structure for making concurrently a focus adjustment and a position adjustment, and a control system for controlling a drive motor in the modification example 1.

FIG. 6 shows an adjustment structure for making a focus adjustment and a position adjustment concurrently to a projected image, and a control system for controlling the drive motor 800.

The drive motor 800 is attached to the attachment plate 209, and an output gear 801 of the drive motor 800 engages with the lens gear 304. When the drive motor 800 rotates, the lens gear 304 rotates and the inner cylinder 303 turns accordingly, whereby the moving lens group 305 is displaced in the lens unit 300. In addition, when the lens gear 304 rotates, the Z axis stage 600 moves accordingly in the up-down direction to move the imager module 207 in the up-down direction. A lifting/lowering direction of the Z axis stage 600 corresponding to a rotation direction of the inner cylinder 303 (a movement direction of the moving lens group 305) is the same as that in the foregoing embodiment. For example, when the inner cylinder 303 turns in a direction that moves the focus lever 301 down, the Z axis stage 600 is lowered. In addition, a gear ratio between the lens-side gear 304 and the imager-side gear 603 is the same as that in the foregoing embodiment.

Amounts of movement of the moving lens group 305 and the imager module 207 depend on an amount of rotation of the drive motor 800. Therefore, the moving lens group 305 and the imager module 207 can be moved to desired positions by controlling the amount of rotation of the drive motor 800 with reference to initial positions of the moving lens group 305 and the imager module 207 (for example, positions of the moving lens group 305 and imager module 207 with the focus lever 301 in the upper limit position).

The drive motor 800 has a rotation sensor 802 inside to detect the amount of rotation of the drive motor 800. A detection signal from the rotation sensor 802 is input into the control circuit 10.

The control circuit 10 is electrically connected with the drive motor 800, the rotation sensor 802, a distance detection circuit 20, a memory 30, and the light emitter 701.

The distance detection circuit 20 determines the main body distance I in accordance with the position detection signal from the position detector 704, and outputs the same to the control circuit 10.

The memory 30 stores a control program for actuating the control circuit 10. The memory 30 stores a control amount table for controlling the drive motor 800. The control amount table has an amount of rotation of the drive motor 800 from the initial position to thereby move the moving lens group 305 to the on-focus position in accordance with the main body distance I (hereinafter, referred to as "on-focus rotation amount").

The control circuit 10 outputs a drive signal to the light emitter 701 which then emits light, and detects the main body distance I based on the light. The control circuit 10 then acquires the on-focus rotation amount corresponding to the detected main body distance I from the table of the memory 30, and controls the drive motor 800 based on the acquired on-focus rotation amount.

Figure 7:
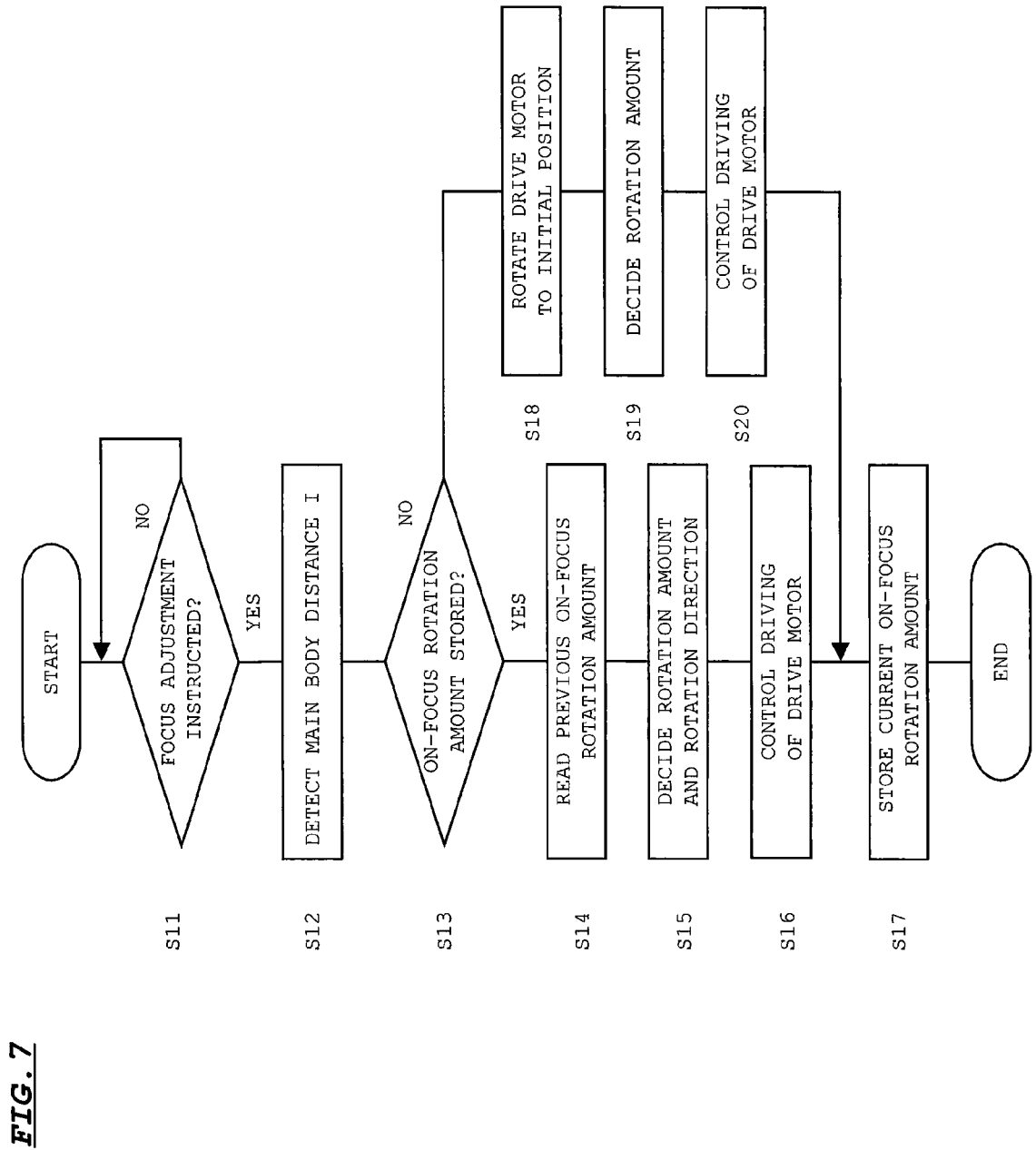
FIG. 7 is a flowchart for a focus adjustment and a position adjustment in the modification example 1.

Operations of a focus adjustment and a position adjustment by the control circuit 10 will be described below with reference to the flowchart in FIG. 7.

To increase the projection size, a user moves the projector from the state of FIG. 4A to the state of FIG. 4B, and then operates the operating button (not shown) for an automatic focus adjustment.

When the user instructs a focus adjustment (S11: YES), the control circuit 10 detects the main body distance I using the distance sensor 700 (S12).

Next, if the memory 30 stores the on-focus rotation amount at the previous focus adjustment (S13: YES), the control circuit 10 reads the previous stored on-focus rotation amount (S14). In general, if the projector has an electrically-operated focus adjustment mechanism with a drive motor, no focus adjustment can be manually made without using the mechanism, and thus the drive motor 800 has not been moved since the previous focus adjustment.

Accordingly, the control circuit 10 acquires the on-focus rotation amount corresponding to the detected main body distance I as a current on-focus rotation amount from the control amount table in the memory 30, and determines a rotation amount and a rotation direction of the drive motor 800 required for moving the moving lens group 305 from the present position to the on-focus position, on the basis of the acquired current on-focus rotation amount and the previous on-focus rotation amount (S15). Then, the control circuit 10 drives the drive motor 800 based on the determined rotation direction and rotation amount (S16).

Thus, the moving lens group 305 moves to the on-focus position, and the projected image comes into proper focus. At the same time, the imager module 207 moves downward, and the position of the projected image changes from the position of Image B to the position of Image C, and the lower end of Image C is set in the same position as the lower end of the image A before the movement of the projector, as shown in FIG. 4B. That is, the position of the lower end of the projected image can be held in the same position even with a change in the throw distance H.

Finally, the control circuit 10 stores the current on-focus rotation amount in the memory 30 (S17). This completes the focus adjustment after the change of the image size and the position adjustment of the projected image.

In some cases, if the projector is used for the first time, for example, the memory 30 stores no previous on-focus rotation amount.

When the control circuit 10 determines at step S13 that the memory 30 stores no on-focus rotation amount, the control circuit 10 drives the drive motor 800 until the moving lens group 305 reaches the initial position (S18). In this embodiment, the upper limit position of the focus lever 301 is set as an initial position, and therefore the moving lens group 305 can move only to the initial position. That is, when the moving lens group 305 has reached the initial position, the drive motor 800 does not rotate any more. When the control circuit 10 determines upon receipt of a detection signal from the rotation sensor 802 that the drive motor 800 does not rotate any more, the control circuit 10 concludes that the moving lens group 305 has reached the initial position.

When the moving lens group 305 has reached the initial position, the control circuit 10 acquires the on-focus rotation amount corresponding to the main body distance I detected at S12 from the table in the memory 30 (S19), and drives the drive motor 800 by the acquired rotation amount (S20). Accordingly, it is possible to make a focus adjustment and a position adjustment to the projected image even if the memory 30 stores no previous on-focus rotation amount.

As stated above, according to the configuration of the modification example 1, a focus adjustment and a position adjustment can be automatically made to a projected image in accordance with the throw distance H, thereby further enhancing the convenience of the user.

Modification Example 2

In the configuration of the modification example 1, if the screen is not disposed on a wall surface, that is, if the screen is placed on a stand or the like with space thereunder, it is difficult to detect distances related to the throw distance H (the main body distance I and others). Therefore, in the modification example 2, an additional arrangement is provided to detect smoothly such distances related to the throw distance H (the main body distance I and others) even if the screen is disposed with space thereunder, for example.

FIGS. 8A and 8B show a configuration of a projector in the modification example 2. FIG. 8A illustrates the projector which is installed to project an image onto the screen, and FIG. 8B illustrates an adjustment structure for the drive motor 800 to make a focus adjustment and a position adjustment concurrently to a projected image.

As shown in FIG. 8A, the projector of the modification example 2 is configured in such a manner that a rear side of the cover 550 enveloping the lens unit 300 becomes approximately flush with the housing 100. Accordingly, the entirely flat projector main body (formed of the housing 100 and the cover 550) is placed with a rear surface on the slide stage 900. The slide stage 900 holds the projector main body so as to be slidable in a front-back direction.

Figure 9A:
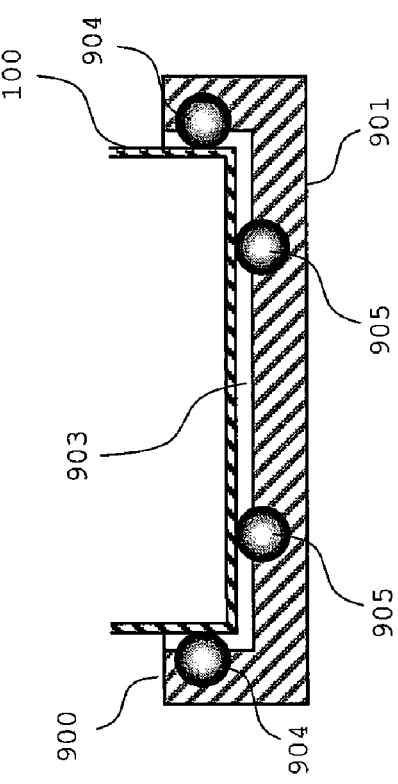
FIGS. 9A and 9B are diagrams showing a configuration of a slide stage in the modification example 2.
Figure 9B:
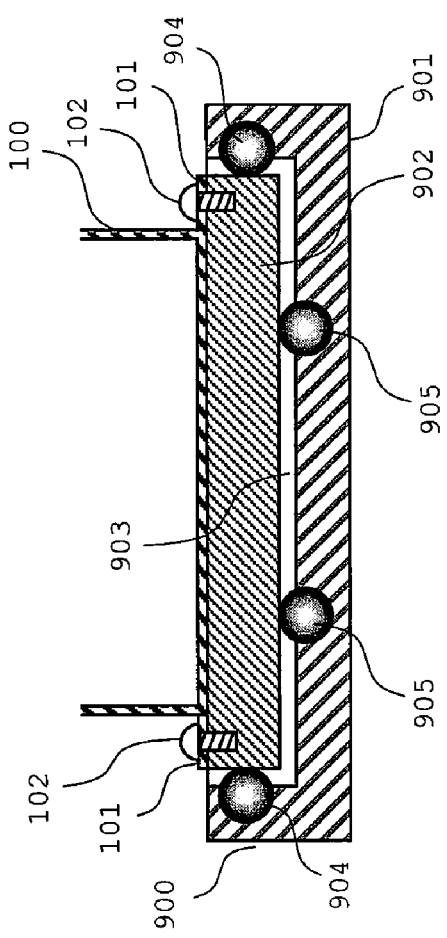

FIGS. 9A and 9B show a configuration of the slide stage 900. FIGS. 9A and 9B are cross-section views of planes vertical to a slide direction. The slide stage 900 includes a fixed stage 901 and a moving stage 902 as shown in FIG. 9A, for example.

The fixed stage 901 has a rail groove 903. The rail groove 903 has a plurality of ball bearings 904 and 905 arranged in the slide direction on both sides and bottom. The moving stage 902 is stored in the rail groove 903, and is contact at both sides and bottom with the bearings 904 and 905.

The projector main body is placed on the moving stage 902. In this arrangement, flange parts 101 formed in the housing 100 are fixed with screws 102 to the placement surface of the moving stage 902. When the moving stage 902 slides in the rail groove 903 in the slide direction, the projector main body slides accordingly in the slide direction.

The slide stage 900 may be composed only of the fixed stage 901, as shown in FIG. 9B. In this arrangement, the bottom of the projector main body is stored in the rail groove 903.

Returning to FIG. 8A, a detection reflective plate 906 is disposed at a front end of the fixed stage 901 in the slide stage 900. The detection reflective plate 906 is formed in such a manner that a reflective surface facing the housing 100 diffusely reflects light.

The housing 100 has the distance sensor 700 at the front end, as with the modification example 1. Light emitted from the distance sensor 700 impinges on the detection reflective plate 906, is diffusely reflected by the detection reflective plate 906, and is taken into the distance sensor 700. Accordingly, it is possible to detect a distance from the detection reflective plate 906 to the projector main body, that is, a movement distance J of the projector main body from the front end of the slide stage 900.

In this arrangement, as shown in FIG. 8A for example, if the position of the front end of the slide stage 900 (the detection reflective plate 906) is aligned with the position of the screen, the movement distance J of the projector main body from a position where the front end of the housing 100 contacts the detection reflective plate 906 (reference position), becomes equal to the distance between the screen and the projector main body in FIG. 4B, that is, the main body distance I. Accordingly, it is possible to make a focus adjustment and a position adjustment to the projected image in accordance with the throw distance H by making a focus adjustment and a position adjustment to the projected image in accordance with the movement distance J.

With the flat bottom of the projector main body, the modification example 2 has further modifications as described below with respect to the foregoing embodiment and the modification example 1.

More specifically, the cover 550 has a first reflective mirror 450 disposed inside. The first reflective mirror 450 has an effective reflective area above the light axis L1 of the lens unit 300 (the projection aperture 551 side). The first reflective mirror 450 has an aspheric or freely curved concave reflective surface.

A second reflective mirror 451 is disposed under the first reflective mirror 450. The second reflective mirror 451 has a flat shape and is fixed on a support stand 452 in such a manner that a reflective surface thereof becomes approximately parallel to the bottom surface of the projector main body.

The imager module 207 is disposed so as to shift downward with respect to the light axis L1 of the lens unit 300. Image light emitted from the optical engine 200 is entered into the lens unit 300. The image light emitted from the lens unit 300 is reflected and converged by the first reflective mirror 450. The image light reflected by the first reflective mirror 450 is further reflected by the second reflective mirror 451, intersects a light path of image light headed from the lens unit 300 toward the first reflective mirror 450, and is projected through the projection aperture 551 onto the screen.

As shown in FIG. 8B, the optical engine 200 has the imager module 207 placed on the stage 651 of the Z axis stage 650 in such a manner that the effective display areas of the liquid crystal panels 203, 204, and 205 are shifted downward (toward the installation plate 208) from the light axis L1 of the lens unit 300.

An imager-side gear 653 is attached at a leading end of a rotation axis 652 of the Z axis stage 650. The imager-side gear 653 engages with the lens-side gear 304. When the lens-side gear 304 turns, the imager-side gear 653 turns accordingly.

When the drive motor 800 rotates, the lens gear 304 rotates accordingly to turn the inner cylinder 303, whereby the moving lens group 305 in the lens unit 300 is displaced. In addition, when the lens gear 304 turns, the Z axis stage 650 moves in the up-down direction, thereby moving the imager module 207 in the up-down direction. In the modification example 2, the Z axis stage 650 is configured in such a manner that a lifting/lowering direction of the Z axis stage 650 corresponding to the turning direction of the inner cylinder 303 (the movement direction of the moving lens group 305) is reversed from those in the foregoing embodiment and the modification example 1. For example, when the inner cylinder 303 turns in a direction that lowers the focus lever 301, the Z axis stage 650 is lifted.

In the configuration of the control system for controlling driving of the drive motor 800, this example is the same as the modification example 1.

Thus, when installing the projector, the slide stage 900 is disposed such that the position of the front end of the slide stage 900 is aligned with the position of the screen, as shown in FIG. 8A. In this installation state, when the projector main body is moved away from the screen to change the throw distance H, the drive motor 800 is driven under the same control as that in the modification example 1, in accordance with the movement distance J detected by the distance sensor 700. This displaces the moving lens group 305 in the lens unit 300 to the on-focus position, thereby bringing the projected image into proper focus. At the same time, the imager module 207 moves upward to change the position of the image light emitted from the lens unit 300, from the position shown by the dotted lines to the position shown by the solid lines in the diagram, thereby lowering the position of the image projected onto the screen surface. This changes the position of the projected image from the position of Image B to the position of Image C, and thus the lower end of Image C is set in the same position as the lower end of Image A before the movement of the projector. That is, the lower end of the projected image can be held in the same position even with a change in the throw distance H.

As stated above, according to the modification example 2, a focus adjustment and a position adjustment can be automatically made to a projected image in accordance with the throw distance H even if the screen is installed with space thereunder. This further enhances convenience of the user.

In the configuration of the modification example 2, an electrical means using the distance sensor 700 and the drive motor 800 makes automatically a focus adjustment and a position adjustment to a projected image. Alternatively, a mechanical means may automatically make a focus adjustment and a position adjustment to a projected image.

In this case, for example, the projector may be configured in such a manner that a rack is provided to the moving stage 902, a pinion rotating with movement of the rack is provided to the fixed stage 901, and a transfer mechanism using a gear is disposed between the pinion and the lens gear 304. In this arrangement, the transfer mechanism can transfer rotation of the pinion with movement of the rack to the lens gear 304, thereby displacing the moving lens group 305 and the imager module 207 in accordance with the movement distance J of the projector main body.

Modification Example 3

Figure 10:
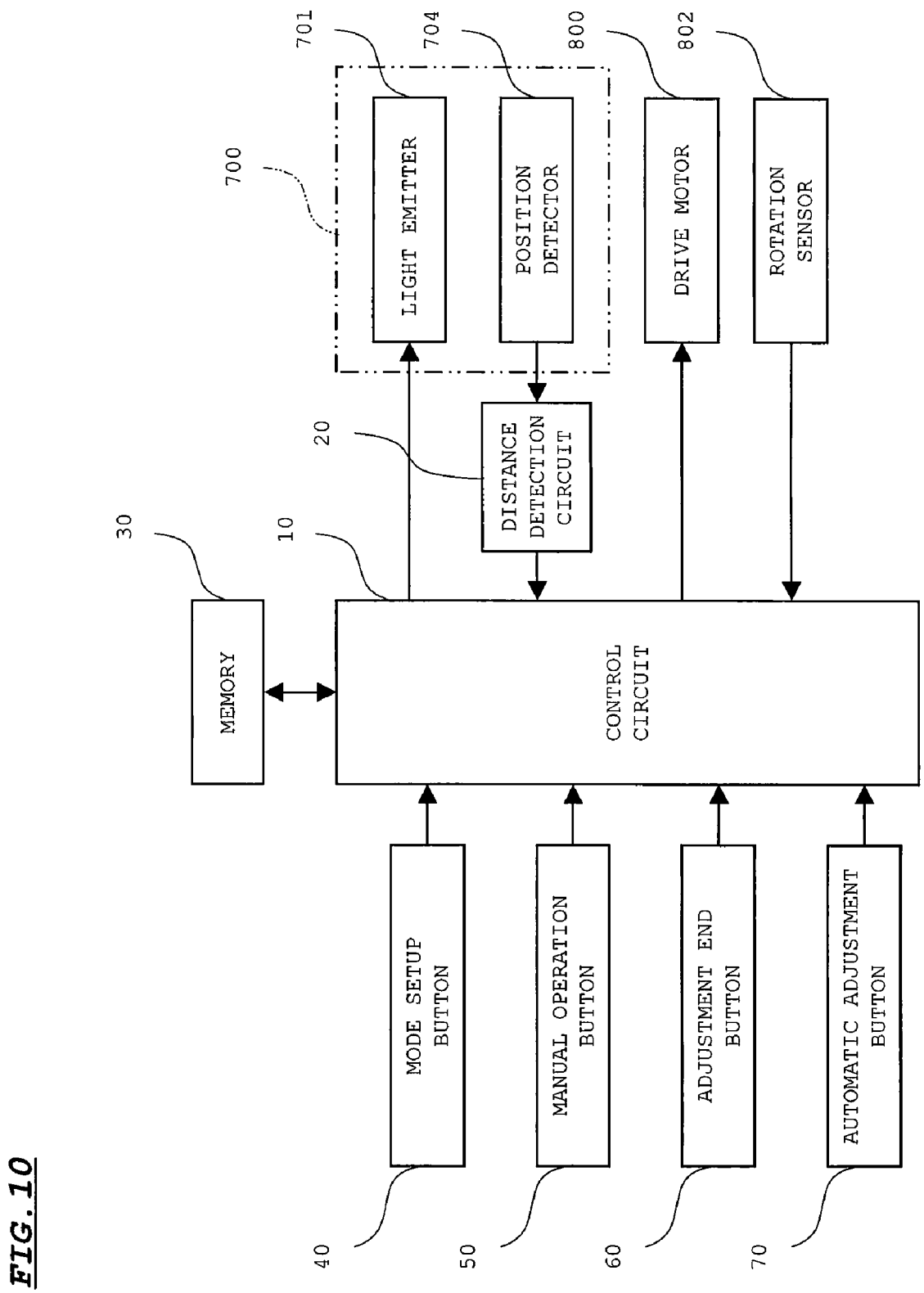
FIG. 10 is a diagram showing a configuration of a projector in a modification example 3.

FIG. 10 shows a configuration of a projector in the modification example 3. The modification example 3 is configured in such a manner that a focus adjustment and a position adjustment can be automatically made to a projected image in accordance with the throw distance H even if the screen is installed with space thereunder, as with the arrangement of the modification example 2.

As shown in FIG. 10, the arrangement of the modification example 3 includes a mode setup button 40, a manual operation button 50, an adjustment end button 60, and an automatic adjustment button 70, in addition to the components in the arrangement of the modification example 1. Operation signals from these buttons are input into the control circuit 10. These buttons may be arranged on the housing 100 or the remote control, or provided in a menu screen.

The mode setup button 40 is intended to make a mode selection between an initial position setup mode for setting the projector in an initially installed position (an initial position of the projector) and an automatic adjustment mode for automatically making a focus adjustment and a position adjustment to a projected image. The manual operation button 50 is operated by a user to manually drive the drive motor 800 for making a focus adjustment in the initial position setup mode. The adjustment end button 60 is operated by a user upon completion of a manual focus adjustment in the initial position setup mode. The automatic adjustment button 70 is operated by a user to make an automatic focus adjustment in the automatic adjustment mode.

There is a linear relationship between the throw distance H and the on-focus position, that is, the focus rotation amount. In the modification example 3, the memory 30 stores a straight inclination coefficient that defines the linear relationship.

In respects other than the foregoing description, this example is the same as the modification example 1.

Figure 11:
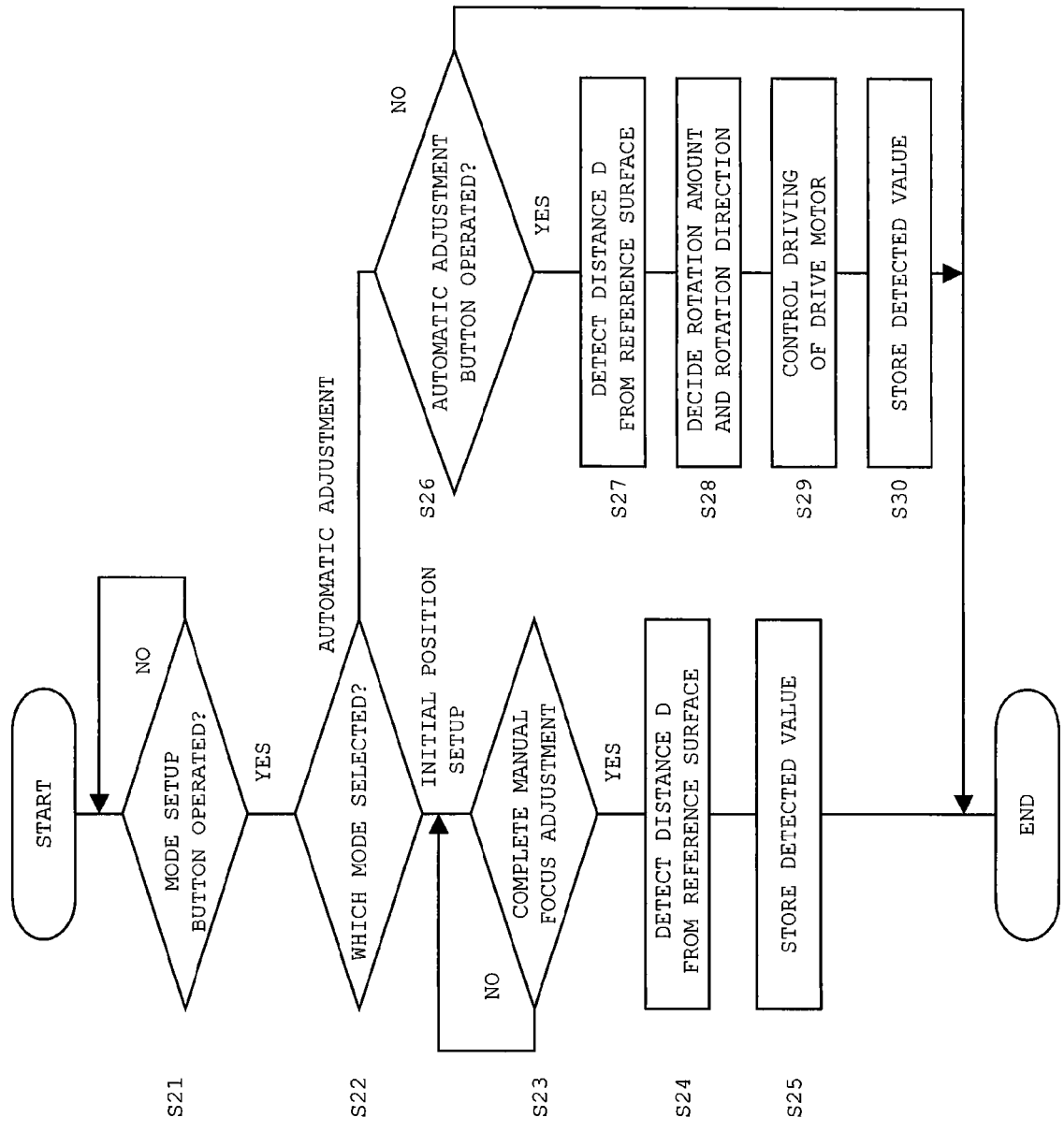
FIG. 11 is a flowchart for a focus adjustment and a position adjustment in the modification example 3.
Figure 12A:
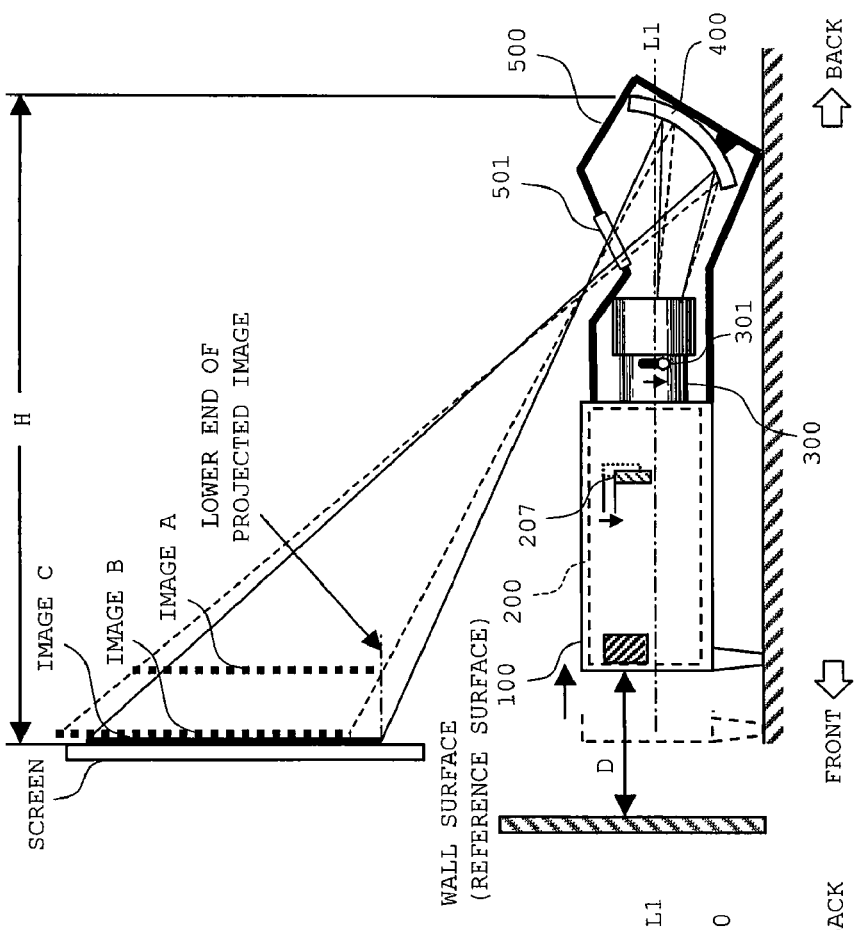
FIGS. 12A and 12B are diagrams for describing a focus adjustment and a position adjustment in the modification example 3.
Figure 12B:
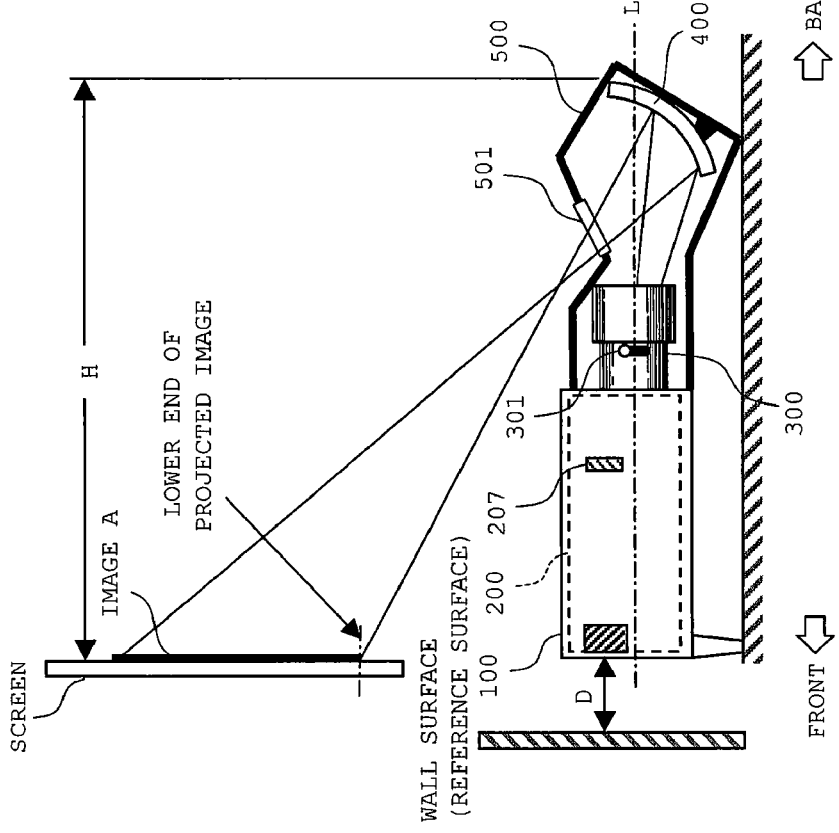

FIG. 11 is a flowchart showing operations of a focus adjustment and a position adjustment in the modification example 3. FIGS. 12A and 12B are diagrams for describing operations of a focus adjustment and a position adjustment made to a projected image. FIG. 12A shows a state of the projector installed in the initial position, and FIG. 12B shows a state of the projector installed away from a screen to increase a projection size.

Operations of a focus adjustment and a position adjustment in the modification example 3 will be described below with reference to FIG. 11 and FIGS. 12A and 12B.

The user installs the projector in a position at a desired throw distance H, as shown in FIG. 12A. Then, the user operates the mode setup button 40 to select the initial position setup mode.

When the control circuit 10 detects that the mode setup button 40 is operated (S21: YES), the control circuit 10 determines which mode is selected (S22). If the control circuit 10 determines that the initial position setup mode is selected (S22: the initial position setup mode), the control circuit 10 then determines whether the user's manual focus adjustment is completed (S23).

After selection of the initial position setup mode, the user operates the manual operation button 50 to manually drive the drive motor 800 while checking an image projected onto the screen, thereby making a focus adjustment so as to bring the image into proper focus. When the projected image comes into proper focus, the user ends the adjustment and operates the adjustment end button 60. The projected image is displayed on the screen in the state of Image A.

When the control circuit 10 determines that the manual focus adjustment is ended from the operation of the adjustment end button 60 (S23: YES), the control circuit 10 detects a distance D between a wall surface in front of the projector (hereinafter, referred to as "reference surface") and the projector main body with the use of the distance sensor 700 (S24). Then, the control circuit 10 stores the detected distance D from the reference surface as projector initial position information in the memory 30 (S25). This completes the initial position setup mode.

Next, if there arises a need to increase a projection size, the user moves the projector away from the screen as shown in FIG. 12B. This enlarges the projection size from the size of Image A to the size of Image B. At the same time, the projected image goes out of focus and the position of the projected image is shifted upward.

Thus, the user operates the mode setup button 40 to select the automatic adjustment mode, and then operates the automatic adjustment button 70.

When the control circuit 10 determines that the automatic adjustment mode has been selected (S22: the automatic adjustment mode) and determines that the automatic adjustment button 70 has been operated (S26: YES), the control circuit 10 uses the distance sensor 700 to detect the distance D from the reference surface (S27). Next, the control circuit 10 determines a differential between the value stored in the memory 30 (initial position information) and the currently detected value, and use the differential and the inclination coefficient stored in the memory 30 to decide an amount of control on the drive motor 800 for displacing the moving lens group 305 from the current position to an on-focus position, that is, a rotation amount and a rotation direction (S28). Then, the control circuit 10 drives the drive motor 800 by the decided rotation direction and the decided rotation amount (S29).

Accordingly, as shown in FIG. 12B, the projected image comes into proper focus, and the position of the projected image changes from the position of Image 3 to the position of Image C. That is, the lower end of the projected image can be held in the same position even with a change in the throw distance H.

Finally, the control circuit 10 stores the distance D from the current reference surface in the memory 30 (S30). This completes the focus adjustment and the position adjustment to the projected image after the image size change.

As described above, according to the configuration of the modification example 3, it is possible to automatically make a focus adjustment and a position adjustment to a projected image in accordance with the throw distance H, even if a distance from a screen cannot be directly detected because the screen is installed with space thereunder or the like. This further enhances convenience of the user.

In addition, the modification example 3 can be simplified in structure as compared to the modification example 2 because the slide stage 900 is not needed.

In addition, the configuration of the modification example 3 may be applied to the configuration of the modification example 2. With such an application, it is possible to automatically make a focus adjustment and a position adjustment to a projected image by detecting the distance from the detection reflective plate 906 in the initial position setup mode, even if the position of the front end of the slide stage 900 cannot be aligned with the position of the screen.

Modification Example of the Optical Engine

In the foregoing embodiments, the optical engine 200 uses the transmissive liquid crystal panels 203, 204, and 205 as an imager. Alternatively, the imager may be a liquid crystal on silicon (LCOS) as a reflective liquid crystal panel or a digital micro mirror device (DMD) as an MEMS device, as in arrangement examples 1 to 5 described below. Similarly, the imagers in the arrangement examples 1 to 5 can also be used in the projectors in the modification examples 1 to 3.

In each of the arrangement examples 1 to 5, similarly to the foregoing embodiments, the spot sizes of R, G, and B lights applied to the imager are made larger than the effective display area of the imager, so that, even when the imager module in the arrangement example moves in the up-down direction, the lights can be applied to the effective display area.

Arrangement Example 1

FIG. 13A shows a configuration of an optical engine 220 in the arrangement example 1. In this arrangement example, LCOS's are used as an imager.

The optical engine 220 includes a light source 221, two mirrors 222 and 223 and two dichroic mirrors 224 and 225 which constitute a light-guiding optical system, an imager module 235 that modulates and combines light from the light-guiding optical system.

The imager module 235 is a module formed by three polarized beam splitters (PBS) 226, 227, and 228, three LCOS's 229, 230, and 231, two λ/2 plate 232 and 233, a dichroic prism 234, and polarizers (not shown) disposed on incident planes of the PBS's 226, 227, and 228.

The light source 221 includes a lamp, a fly-eye lens, a PBS array, and a condenser lens. Light emitted from the light source 221 is aligned by the PBS array in a direction of polarization.

The light emitted from the light source 221 is reflected by the mirror 222 and entered into the dichroic mirror 224. In the incident light, the dichroic mirror 224 reflects R and G lights and lets R light pass through.

The R and G lights reflected by the dichroic mirror 224 is further reflected by the mirror 223 and entered into the dichroic mirror 225. The dichroic mirror 225 reflects the G light and lets the R light pass through.

After having passed through the dichroic mirror 225, the R light is cleared of an unnecessary P polarization component by the polarizer (not shown) so as to turn into an S polarized light with respect to the PBS 226, and the R light is reflected by the PBS 226 and then applied to the LCOS 229. The LCOS 229 modulates and reflects the R light in accordance with an image signal. More specifically, the LCOS 229 rotates the polarization direction of the R light in accordance with an image signal for each of pixels constituting the effective display area of the LOCS 229.

Thus, the modulated R light passes through the PBS 226 in the polarization direction, and passes through the λ/2 plate 232 to thereby further rotate the polarization direction, and then enters the dichroic prism 234.

In addition, the G light reflected by the dichroic mirror 225 is cleared of an unnecessary P polarization component by the polarizer (not shown) so as to turn into an S polarized light with respect to the PBS 227, and the G light is reflected by the PBS 227 and applied to the LCOS 230. The LCOS 230 modulates and reflects the G light in accordance with an image signal.

Thus, the modulated G light passes through the PBS 227 in the polarized direction and enters the dichroic prism 234.

In addition, after having passed through the dichroic mirror 224, the B light is cleared of an unnecessary P polarized component by the polarizer (not shown) so as to turn into an S polarized light with respect to the PBS 228, and the B light is reflected by the PBS 228 and applied to the LCOS 231. The LCOS 231 modulates and reflects the B light in accordance with an image signal.

Thus, the modulated B light passes through the PBS 228 in the polarization direction, and passes through the λ/2 plate 223 to thereby further rotate the polarization direction, and then enters the dichroic prism 234.

The R and B lights are reflected by the dichroic prism 234 and the G light passes through the dichroic prism 234, whereby the three lights are combined and entered as image light into the lens unit 300.

After having been modulated by the LOCS's 229, 230, and 231 and then having passes through the PBS 226, 227, and 228, the R, G and B lights are turned into P polarized lights with respect to the dichroic prism 234. In this arrangement, an S polarized light is higher than a P polarized light in reflectivity at a wider wavelength band due to characteristics of a dielectric multilayer structure of a dichroic prism. Accordingly, in the dichroic prism 234, the G light is higher in transmission efficiency, but the R and B lights become lower in reflection efficiency since they are P polarized lights. Thus, in the optical engine 220 of FIG. 13A, the R and B lights are allowed to pass through the λ/2 plates 223 and 224 so as to turn into S polarized lights, thereby increasing reflection efficiencies of the R and B lights at the dichroic prism 234.

In this arrangement example, the imager module 235 is placed on the stage 602 (651) of the Z axis stage 600 (650) so as to be shifted in the up-down direction.

Arrangement Example 2

FIG. 13B shows a configuration of an optical engine 240 in the arrangement example 2. This arrangement example also uses LOCS's as an imager as with the arrangement example 1.

The optical engine 240 includes a light source 241 and an imager module 247 that modulates and combines light from the light source.

The imager module 247 is a module formed by a PBS 242, a dichroic prism 243, three LCOS's 244, 245, and 246, and a polarizer (not shown) disposed on an incident plane of the PBS 242.

The light source 241 includes a lamp, a fly-eye lens, a PBS array, and a condenser lens. Light emitted from the light source 241 is aligned by the PBS array in a direction of polarization.

The light emitted from the light source 241 is cleared of an unnecessary P polarization component by the polarizer (not shown) so as to turn into an S polarized light with respect to the PBS 242, and the light is reflected by the PBS 242 and entered into the dichroic prism 243. In the light entered into the dichroic prism 243, the R and B lights are reflected by the dichroic prism 243, and applied to the LCOS's 244 and 246, respectively. In addition, the G light passes through the dichroic prism 243 and is applied to the LOCS 245.

The R, G, and B lights modulated by the LOCS's 244, 245, and 246 are entered again into the dichroic prism 243 for color combination, and then the combined light passes through the PBS 242 in the polarization direction, and enters as image light into the lens unit 300.

In this arrangement example, the imager module 247 is placed on the stage 602 (651) of the Z axis stage 600 (650) so as to be shifted in the up-down direction.

Arrangement Example 3

FIG. 14A shows a configuration of an optical engine 260 in the arrangement example 3. This arrangement example uses a single-plate DMD as an imager.

The optical engine 260 includes a light source 261, a rod integrator 262, a color wheel 263, and a relay lens group 264 that constitute a light-guiding optical system, and an imager module 267 that modulates and combines light from the light-guiding optical system.

The imager module 267 is a module formed by a total internal reflection (TIR) prism 265 and a single-plate DMD 266.

Light emitted from the light source 261 is equalized in illuminance distribution by the rod integrator 262, and then entered into the color wheel 263. The color wheel 263 includes red, green, and blue filters which are sequentially switched over in a short period of time. The red filter allows only R light to pass through, the green filter allows only G light to pass through, and the blue filter allows only B light to pass through.

The color wheel may include white, yellow, cyan, magenta and other colored filters in addition to the red, green, and blue ones.

After having passed through the color wheel 263 with time differences, the R, G, and B lights pass through the relay lens group 264, and are further reflected by the TIR prism 265 and applied to the DMD 266. Then, after having been modulated by the DMD 266, the lights pass through the TIR prism 265 and enter the lens unit 300.

Since the color wheel 263 has the filters switched over at a high speed, the R, G, and B lights are combined and displayed as an image on the screen.

In this arrangement example, the imager module 267 is placed on the stage 602 (651) of the Z axis stage 600 (650) so as to be shifted in the up-down direction.

Arrangement Example 4

FIGS. 14B and 14C show a configuration of an optical engine 270 in the arrangement example 4. FIG. 14B is a top view, and FIG. 14C is a side view as seen in a direction of an arrow P in FIG. 14B. FIG. 14C illustrates no portion ranging from a light source 271 to a relay lens group 274.

This arrangement example also uses a single-plate DMD as an imager, as with the color wheel 263 in the arrangement example 3.

The optical engine 270 includes the light source 271, a color wheel 272, a rod integrator 273, the relay lens group 274, a flat mirror 275, a concave mirror 276, and a single-plate DMD 277.

Light emitted from the light source 271 enters the color wheel 272. The color wheel 272 includes red, green, and blue filters which are sequentially switched over in a short period of time, as with the arrangement example 3.

The color wheel may include white, yellow, cyan, magenta, and other colored filters in addition to the red, green, and blue ones.

After having passed through the color wheel 272 with time differences, the R, G, and B lights are equalized in illuminance distribution by the rod integrator 273, and then emitted from the relay lens group 274.

As shown in FIG. 14C, the DMD 277 is disposed so as to shift upward with respect to the light axis L1 of the lens unit 300. In addition, the flat mirror 275 is disposed so as to be inclined with respect to a light axis of the light source 271, so that the light from the light source 271 enters at a predetermined incident angle with respect to the DMD 277. The concave mirror 276 is eccentrically displaced so as to be inclined with respect to the light axis of the light source 271 and the light axis L1 of the lens unit 300, so that the light from the light source 271 enters at a predetermined incident angle with respect to the DMD 277.

The R, G, and B lights emitted from the relay lens group 274 are reflected by the flat mirror 275, further reflected by the concave mirror 276, and applied to the DMD 277. Then, the lights are modulated by the DMD 277 and entered into the lens unit 300.

Since the color wheel 272 has the filters switched over at a high speed, the R, G, and B lights are combined and displayed as an image on the screen.

In this arrangement example, the imager module 277 is placed on the stage 602 (651) of the Z axis stage 600 (650) so as to be shifted in the up-down direction.

Arrangement Example 5

Figure 15:
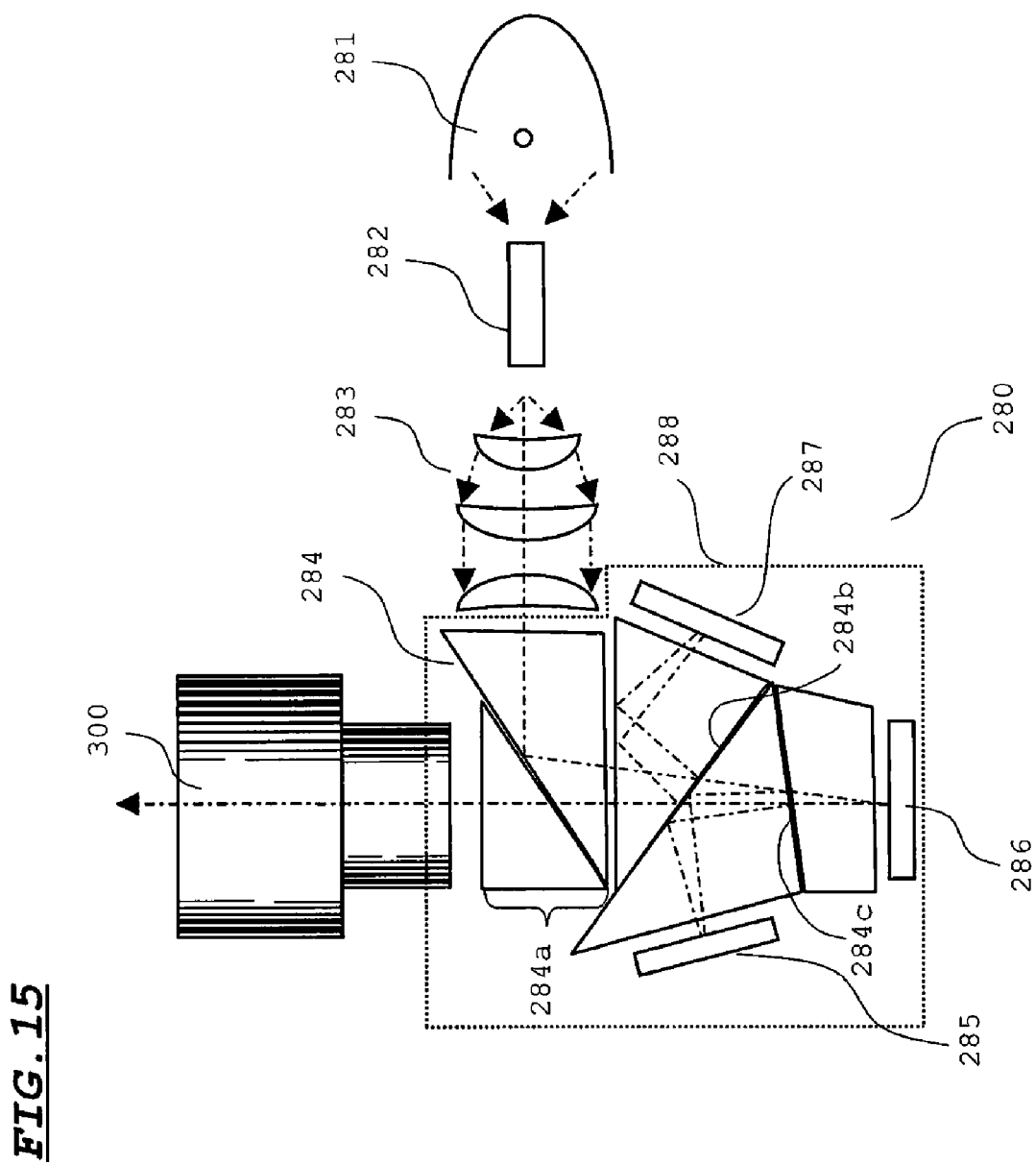
FIG. 15 is a diagram for describing a modification example of the optical engine (arrangement example 5)

FIG. 15 shows a configuration of an optical engine 280 in the arrangement example 5. This arrangement example uses a three-plate DMD.

The optical engine 280 includes a light source 281, a rod integrator 282 and a relay lens group 283 that constitute a light-guiding optical system, and an imager module 288 that modulates and combines light from the light-guiding optical system.

The imager module 288 is a module formed by a 3-digital micro-mirror device (DMD) color separation/combination prism 284 including a TIR prim 284a, and DMDs 285, 286, and 287.

Light emitted from the light source 281 is equalized in illuminance distribution by the rod integrator 282, and then is entered through the relay lens group 283 into the TIR prism 284a of the 3-DMD color separation/combination prism 284. For example, JP 2006-79080 A describes a detailed configuration of the 3-DMD color separation/combination prism 284.

The light entered into the 3-DMD color separation/combination prism 284 is separated by dichroic films 284b and 284c constituting the 3-DMD color separation/combination prism 284, and the separated lights are entered into the DMDs 285, 286, and 287. The R, G, and B lights modulated by the DMDs 285, 286, and 287 are unified in light path by the 3-DMD color separation/combination prism 284, and the image light combined from the three color lights is entered from the TIR 284a into the lens unit 300.

In this arrangement example, the imager module 288 is placed on the stage 602 (651) of the Z axis stage 600 (650) so as to be shifted in the up-down direction.

Others

In the foregoing embodiments and modification examples, the imager module 207 is shifted by the Z axis stage 600, 650. Alternatively, the imager module 207 may be shifted by another displacement means. For example, the stage for placement of the imager module 207 may be held so as to be shifted by a guide, whereby the stage is shifted along the guide with movement of the cam.

Figure 16B:
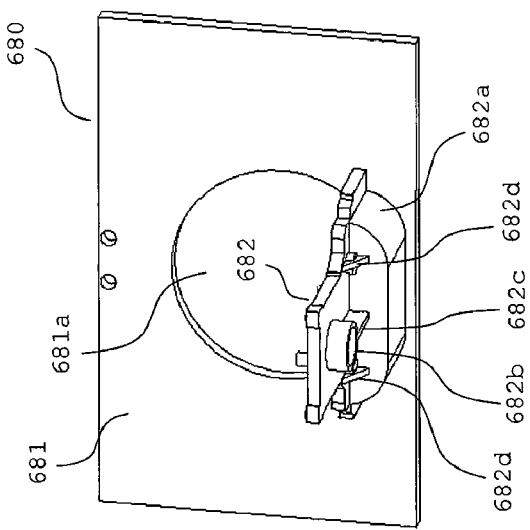
FIGS. 16A, 16B, and 16C are diagrams showing an arrangement example of a displacement means in place of a Z axis stage.
Figure 16C:
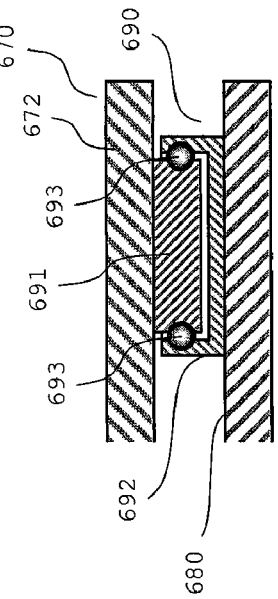
Figure 16A:
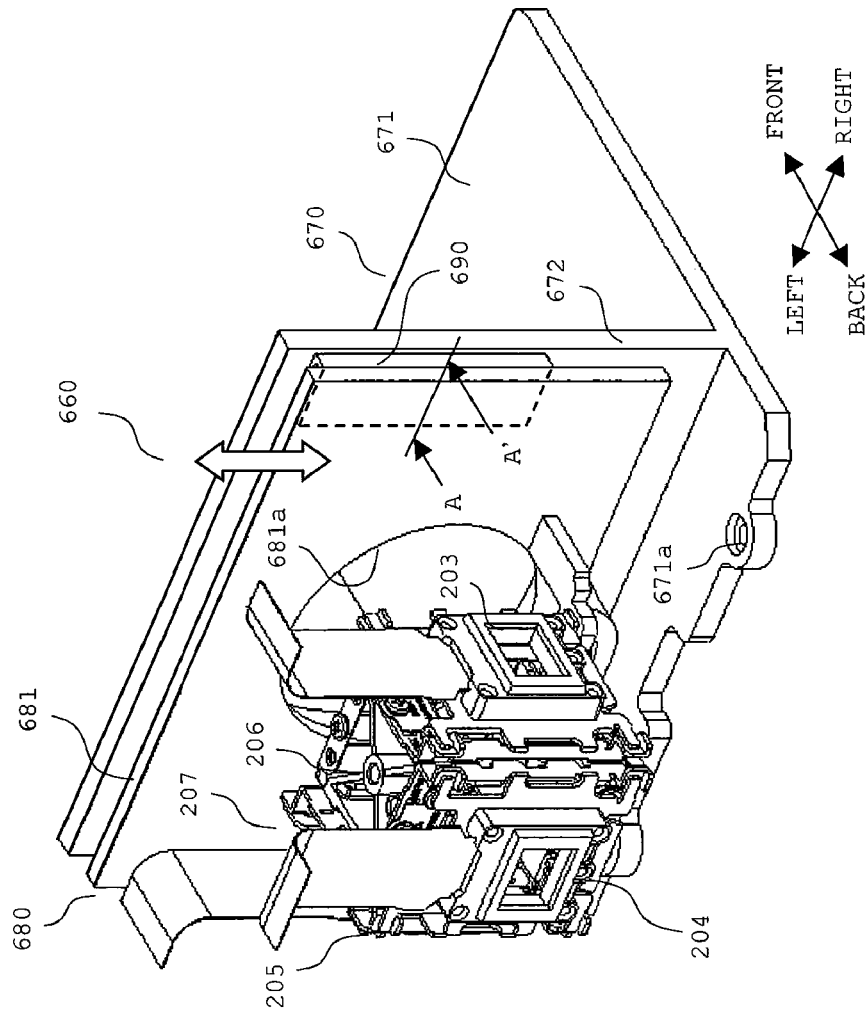

FIGS. 16A, 16B, and 16C show an arrangement example of a displacement means in place of the Z axis stage 600, 650. FIG. 16A is a perspective view of a lifting/lowering device 660 in this arrangement example, and FIG. 16B is a perspective view of a fixing member 680. FIG. 16C is a cross-section view of FIG. 16A taken along a line A-A' for describing a configuration of a linear guide 690.

The lifting/lowering device 660 includes a base member 670, the fixing member 680, and linear guides 690.

The base member 670 includes a pedestal 671, and a support plate 672 that extends vertically (upward) with respect to the pedestal 671. The pedestal 671 has attachment holes 671a on right and left sides of a rear end (shown on the right side only). The base member 670 is screwed at predetermined positions in the housing 100 through the attachment holes 671a.

The fixing member 680 is attached to a rear side of the support plate 672 via the right and left linear guides 690 (shown on the right side only).

The fixing member 680 includes a flat-plate part 681 that is disposed along the support plate 672. The flat-plate part 681 has an opening 681a through which image light from the imager module 207 passes.

A placement part 682 is integrated with the flat-plate part 681 as shown in FIG. 16B. The imager module 207 is placed on the placement part 682 (refer to FIG. 16A). The placement surface of the placement part 682 is vertical to the flat-plate part 681 and the support plate 672.

A reception part 682a is integrated at a base portion with the underside of the placement part 682 such that the reception part 682a is linked to the flat-plate part 681, thereby enhancing strength of the base portion of the placement part 682. In addition, an attachment boss 682b is formed on the underside of the placement part 682 so that the imager module 207 can be screwed to a leading end of the placement part 682. Further, a reinforcement rib 682c is formed so as to connect the reception part 682a and the attachment boss 682b. In addition, two reinforcement ribs 682d connecting to the reception part 682a are formed on both sides of the reinforcement rib 682c. These reinforcement ribs 682c and 682d are both formed along a direction in which the placement part 682 projects from the flat-plate part 681.

As stated above, the placement part 682 is reinforced by the reception part 682a, the attachment boss 682b, and the reinforcement ribs 682c and 682d. This prevents that the leading end of the placement part 682 is deformed downward under the weight of the imager module 207. In addition, the imager module 207 generates high heat by applied light. Therefore, the placement part 682 is prone to be heated at a high temperature, but the foregoing reinforcement components prevent thermal deformation of the placement part 682.

The linear guide 690 includes a rail 691 that extends in the up-down direction, and a stage 692 that engages with the rail 691 and moves on the rail 691 in the up-down direction, as shown in FIG. 16C. The rail 691 has a plurality of ball bearings 693 disposed on both sides in the up-down direction at predetermined intervals therebetween. This allows the stage 692 to move smoothly on the rail 691. The rail 691 is fixed to the support plate 672, and the stage 542 is fixed to the fixing member 680.

As stated above, the fixing member 680 is supported by the support plate 672 so that the fixing member 680 can be displaced in the up-down direction by the two right and left linear guides 690.

The fixing member 680 is connected via an interlocking mechanism (not shown) to the lens-side gear 304 of the lens unit 300 as shown in FIG. 2B. The interlocking mechanism may lift or lower the fixing member 680 using the cam, for example.

Accordingly, when the focus lever 301 of the lens unit 300 is operated to turn the lens-side gear 304, the interlocking mechanism actuates, and the fixing member 680 shifts upward or downward in accordance with the actuation. With this shift, the imager module 207 shifts upward or downward.

The foregoing embodiments and modification examples use a lamp with a reflector as a light source. However, the light source is not limited to this, and may be LEDs or laser diodes. In this case, in such a single-plate DMD optical engine as described in relation to the arrangement examples 3 and 4, LEDs or laser diodes as a light source may be turned on by color in a time-division manner, in place of a color wheel.

As above, preferred embodiments of the present invention are described. However, the present invention is not limited by these embodiments. In addition, the foregoing embodiments of the present invention can be modified in various manners as appropriate, within the scope of technical ideas defined by the claims.

What is claimed is:

1. A projection display device, comprising:
   an imager that modulates light from a light source in accordance with an image signal;
   a projection optical system that enlarges and projects the light modulated by the imager onto a projection plane;
   a focus adjustment part provided in the projection optical system;
   a displacement part that displaces an optical position of the imager relative to the projection optical system in a direction vertical to a light axis of the projection optical system in conjunction with the focus adjustment part; and
   a drive part that drives the focus adjustment part and the displacement part in accordance with a throw distance from the projection optical system to the projection plane, wherein
   the drive part drives the focus adjustment part and the displacement part in such a manner that an amount of shift of the imager from the light axis becomes smaller with the increasing throw distance.

2. The projection display device according to claim 1, wherein the displacement part displaces the imager in the direction vertical to the light axis of the projection optical system.

3. The projection display device according to claim 1, further comprising:
   a distance detection part that detects a distance in relation to the throw distance, wherein
   the drive part includes a drive source for driving the focus adjustment part and the displacement part, and controls the drive source in accordance with the distance detected by the distance detection part.

4. The projection display device according to claim 3, further comprising:
   a slide stage on which a main body of the projection display device is placed in such a manner that the main body can slide in directions that come closer to or away from the projection plane, wherein
   the distance detection part includes a detection part for detecting a movement distance of the main body on the slide stage from a reference position, as the distance in relation to the throw distance.

5. The projection display device according to claim 3, wherein
   the distance detection part includes a distance sensor that detects a distance from a predetermined reference surface as the distance in relation to the throw distance, and
   the focus adjustment part makes a focus adjustment when the projection display device is in a first position, and thereafter, when the projection display device is moved to a second position different from the first position, the drive part acquires an amount of control on the drive source after the movement, on the basis of the two distances detected by the distance sensor before and after the movement, respectively.

* * * * *